(12) United States Patent
Anthony et al.

(10) Patent No.: US 9,755,869 B2
(45) Date of Patent: Sep. 5, 2017

(54) PROCESS FOR TUNNELIZED CYCLOSTATIONARY TO ACHIEVE LOW-ENERGY SPECTRUM SENSING

(71) Applicant: BAE Systems Information and Electronic Systems Integration Inc., Nashua, NH (US)

(72) Inventors: Michael P. Anthony, Andover, MA (US); Jack Chuang, Merrimack, NH (US); Apurva N. Mody, Chelmsford, MA (US); Chad M. Spooner, Carmel, CA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 14/761,958

(22) PCT Filed: Nov. 18, 2014

(86) PCT No.: PCT/US2014/066180
§ 371 (c)(1),
(2) Date: Jul. 20, 2015

(87) PCT Pub. No.: WO2015/126486
PCT Pub. Date: Aug. 27, 2015

(65) Prior Publication Data
US 2016/0269205 A1    Sep. 15, 2016

Related U.S. Application Data

(60) Provisional application No. 61/905,554, filed on Nov. 18, 2013.

(51) Int. Cl.
H04L 27/00 (2006.01)
H04L 12/46 (2006.01)
H04L 5/00 (2006.01)

(52) U.S. Cl.
CPC ...... *H04L 27/0006* (2013.01); *H04L 12/4633* (2013.01); *H04L 27/0012* (2013.01); *H04L 5/003* (2013.01)

(58) Field of Classification Search
CPC ......... H04L 12/4633; H04L 2025/0335; H04L 2025/03598; H04L 2025/03605;
(Continued)

(56) References Cited

U.S. PATENT DOCUMENTS

2004/0086027 A1    5/2004  Shattil
2004/0204878 A1   10/2004  Anderson et al.
(Continued)

OTHER PUBLICATIONS

W.A. Brown, III and H.H. Loomis, Jr., Digital Implementations of Spectral Correlation Analyzers, IEEE Transactions on Signal Processing, vol. 41, No. 2, Feb. 1993, pp. 703-720.
(Continued)

*Primary Examiner* — Young T Tse
(74) *Attorney, Agent, or Firm* — Sand & Sebolt, LPA; Scott J. Asmus

(57) ABSTRACT

A system and method use tunnelizing for analyzing frequency spectrum. The method may include the steps of under sampling an input signal to take samples in one or more tunnels each with a tunnel bandwidth that is equal to or less than a total analysis bandwidth of the input signal; detecting one or more cyclostationary features of the input signal based on the samples; and determining one or more signal types of the one or more cyclostationary features based on the one or more cyclostationary features.

20 Claims, 20 Drawing Sheets

(58) Field of Classification Search
CPC ............. H04L 27/0006; H04L 27/0008; H04L 27/0012; H04L 27/265; H04L 27/2668; H04L 5/003
USPC ................ 375/224, 225, 260, 324, 325, 355
See application file for complete search history.

(56) References Cited

U.S. PATENT DOCUMENTS

| | | | |
|---|---|---|---|
| 2005/0281321 A1* | 12/2005 | Bergstrom | H04B 1/7102 375/144 |
| 2007/0092045 A1* | 4/2007 | Woo | H04B 1/406 375/343 |
| 2010/0195705 A1 | 8/2010 | Jallon | |
| 2011/0191469 A1 | 8/2011 | Oran | |
| 2012/0183030 A1 | 7/2012 | Turunen et al. | |
| 2013/0045703 A1* | 2/2013 | Kommate | H04B 7/0857 455/226.1 |
| 2014/0064114 A1* | 3/2014 | Wang | H04L 5/0048 370/252 |

OTHER PUBLICATIONS

Written Opinion of the International Search Authority for International Application No. PCT/US14/066180, mailed Jul. 30, 2015, 14 pages.

* cited by examiner

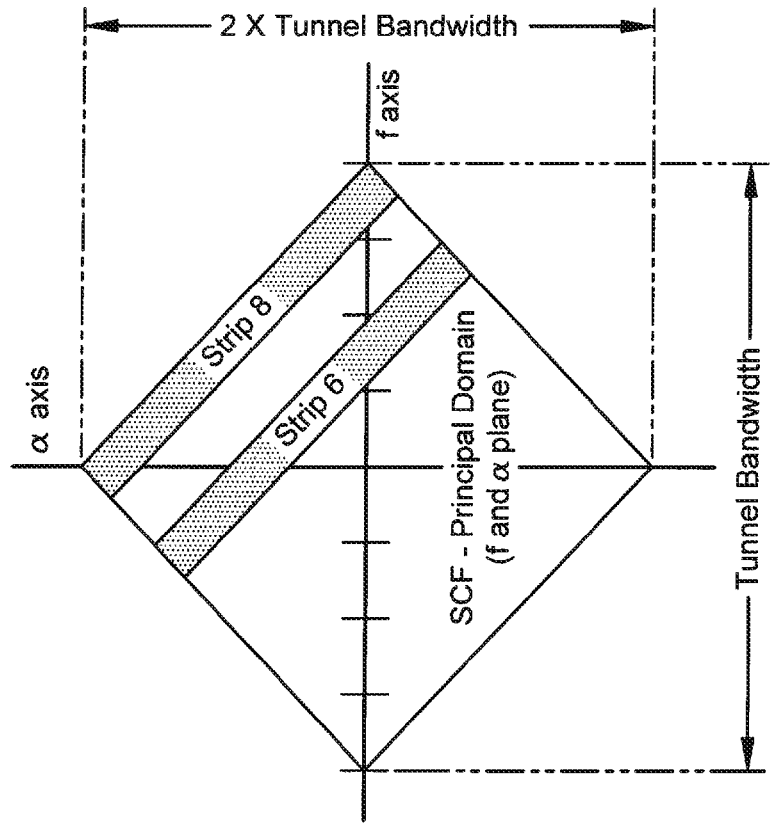
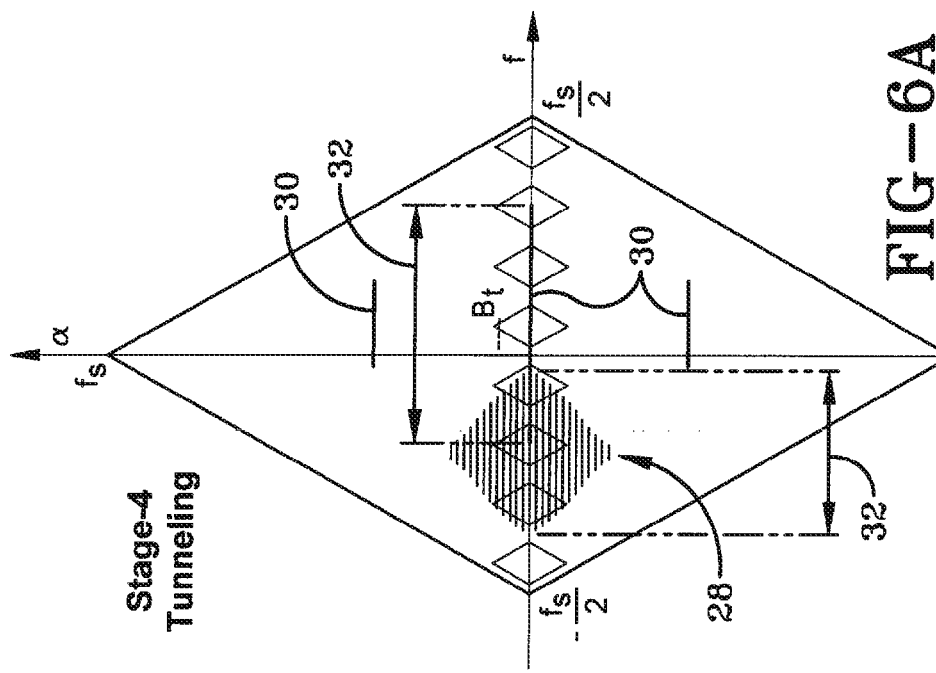

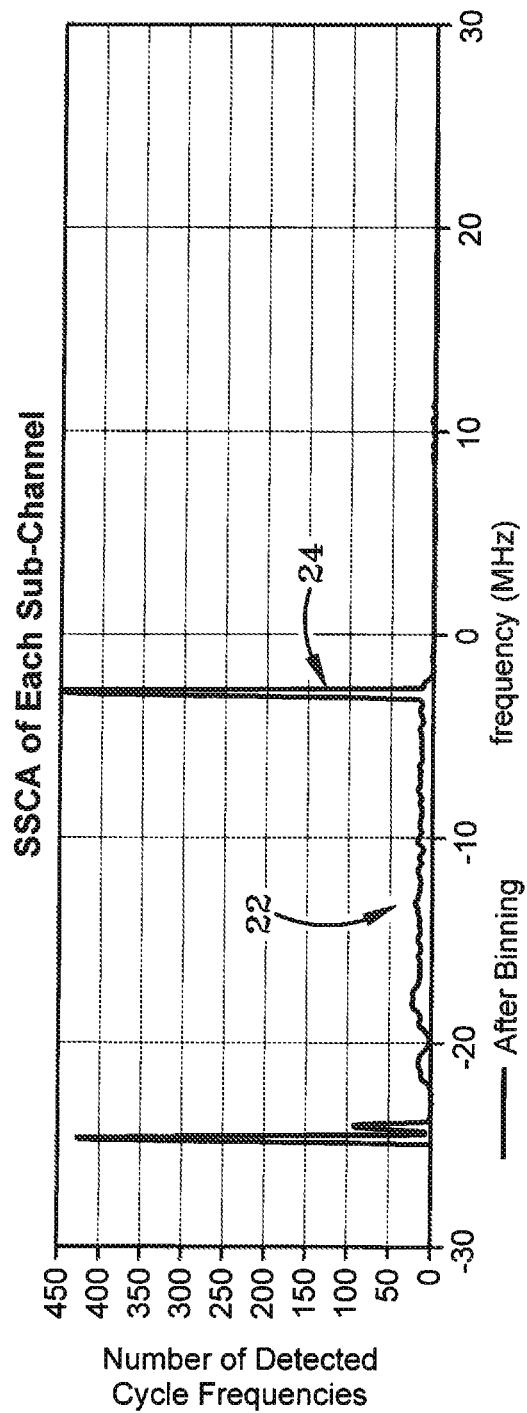

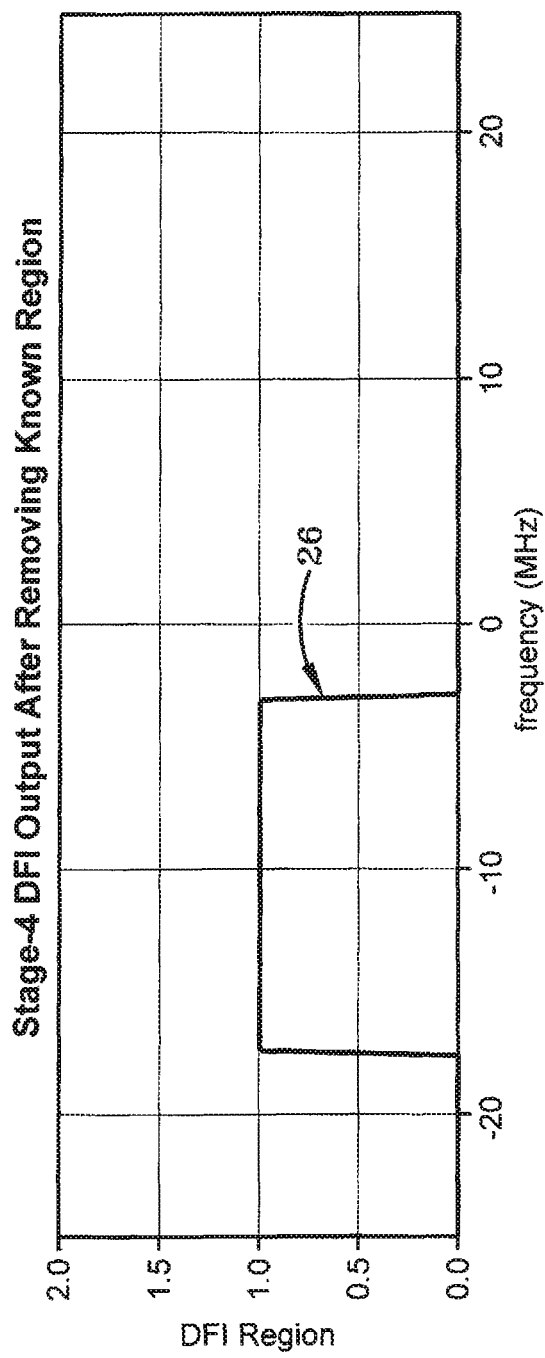

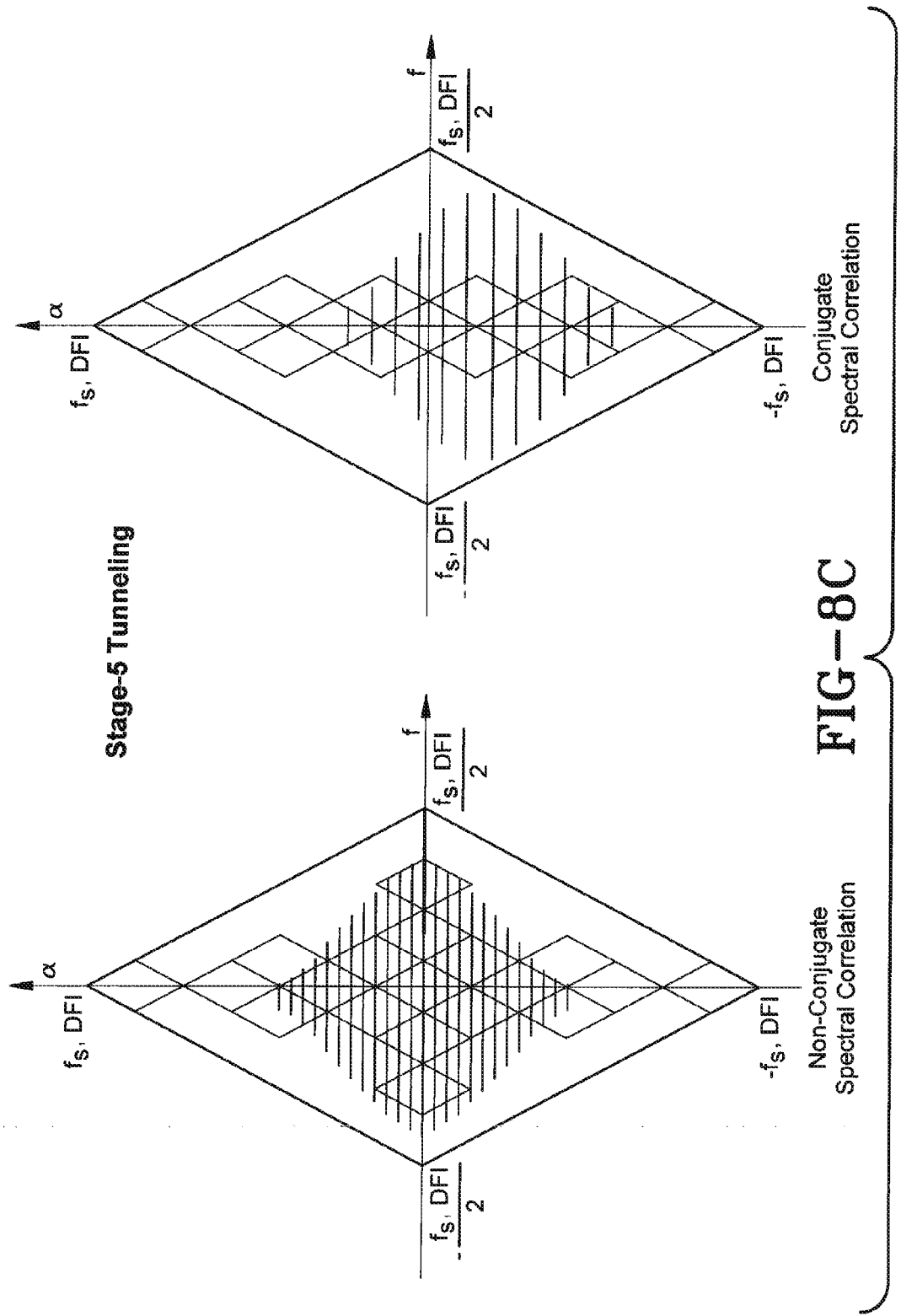

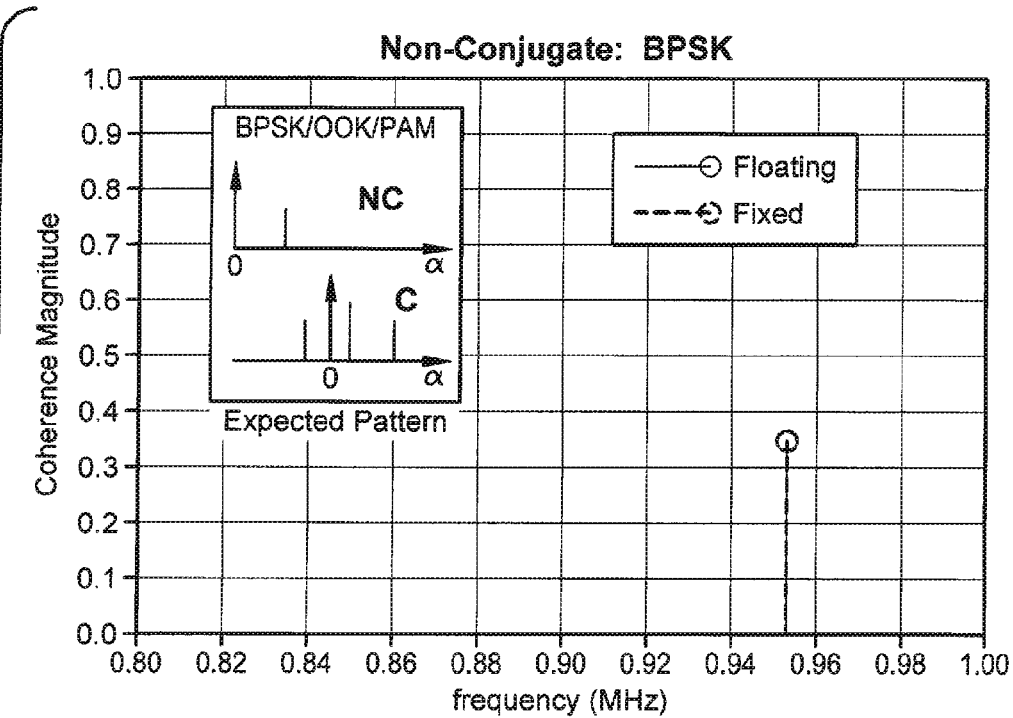
FIG-9A
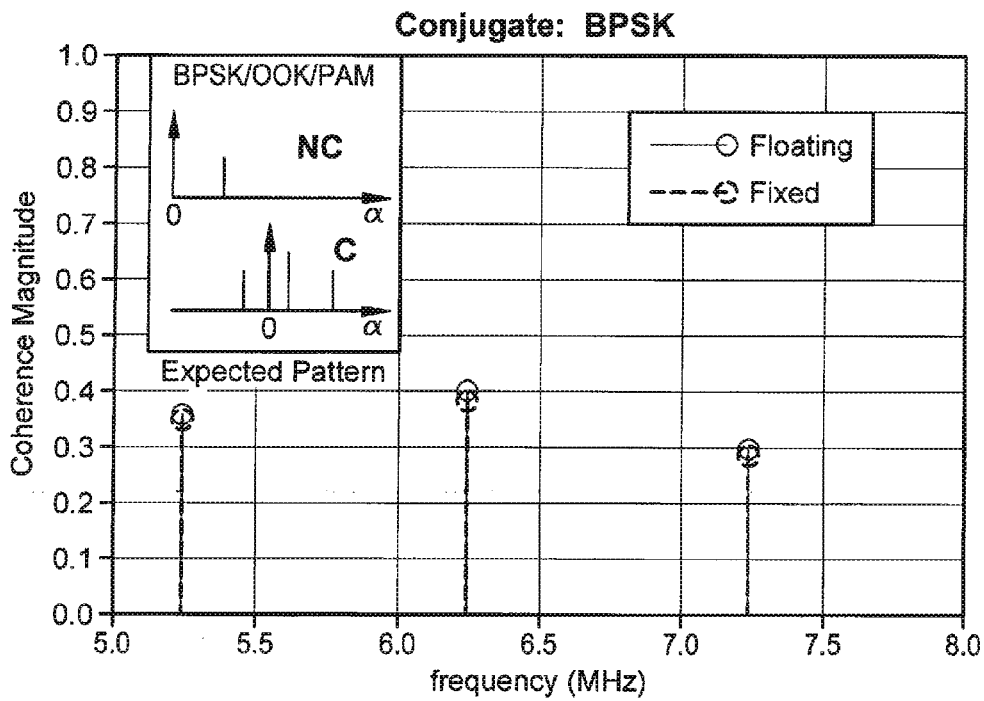

PROCESS FOR TUNNELIZED CYCLOSTATIONARY TO ACHIEVE LOW-ENERGY SPECTRUM SENSING

STATEMENT OF GOVERNMENT INTEREST

The invention was made with United States Government support under Contract No. FA8650-11-C-7160 awarded by the Defense Advanced Research Projects Agency (DARPA). The United States Government has certain rights in this invention.

BACKGROUND OF THE INVENTION

1. Field of Invention

The present invention relates to spectrum sensing and more particularly to spectrum sensing by means of tunnelized cyclostationary processing. The current invention relates generally to apparatus, systems and methods for spectrum sensing. More particularly, the apparatus, systems and methods relate to wireless systems signal detection, signal characterization and more efficient use of spectrum. Specifically, the apparatus, systems and methods provide for low-energy implementation of cyclostationary spectrum sensing algorithms disclosed herein as "Tunnelized Cyclostationary Processing".

2. Description of Related Art

Spectrum sensing has been widely used for cognitive radio systems. Techniques that exploit second and higher order cyclostationarity features to detect and classify signals are highly desirable. However, their pervasive use and hardware implementation consumes a lot of energy. A significant amount of research has been conducted in the area of spectrum sensing. However, the underlying assumption of a majority of these techniques has been the use of energy detection which performs poorly in dynamic interference environments and cannot perform signal classification. Second and higher order cyclostationarity based sensing helps in distinguishing between signals and detecting anomalies. However, a majority of these approaches are prohibitively expensive in terms of computation.

SUMMARY

In one aspect, the invention may provide a method comprising the steps of under sampling an input signal to take samples in one or more tunnels each with a tunnel bandwidth that is equal to or less than a total analysis bandwidth of the input signal; detecting one or more cyclostationary features of the input signal based on the samples; and determining one or more signal types of the one or more cyclostationary features based on the one or more cyclostationary features.

BRIEF DESCRIPTION OF SEVERAL VIEWS OF THE DRAWINGS

One or more embodiments that illustrate the best mode(s) are set forth in the drawings and in the following description. The appended claims particularly and distinctly point out and set forth the invention.

FIG. 6A shows the concept behind unknown signal detection using blind CF estimation to find the Detected Frequency Interval (DFI).

FIG. 6B shows Stage 4 spectral correlation function estimation for unknown signal types using strip spectral correlation analyzer (SSCA).

FIGS. 7A, 7B and 7C show graphs illustrating Stage 4 and Stage 5 spectral correlation function estimation for unknown signal types using SSCA.

FIG. 8C illustrates that not all the diamond-like regions need to be analyzed for blind classification of the unknown-types of signal.

FIG. 9A shows Stage 5 Level 0 and Level 1 Cycle Frequency Pattern analysis to recognize various modulation formats. The Signal to Noise Ratio (SNR) is 3 dB in this illustration.

Similar numbers refer to similar parts throughout the drawings.

DETAILED DESCRIPTION

Figure 1:
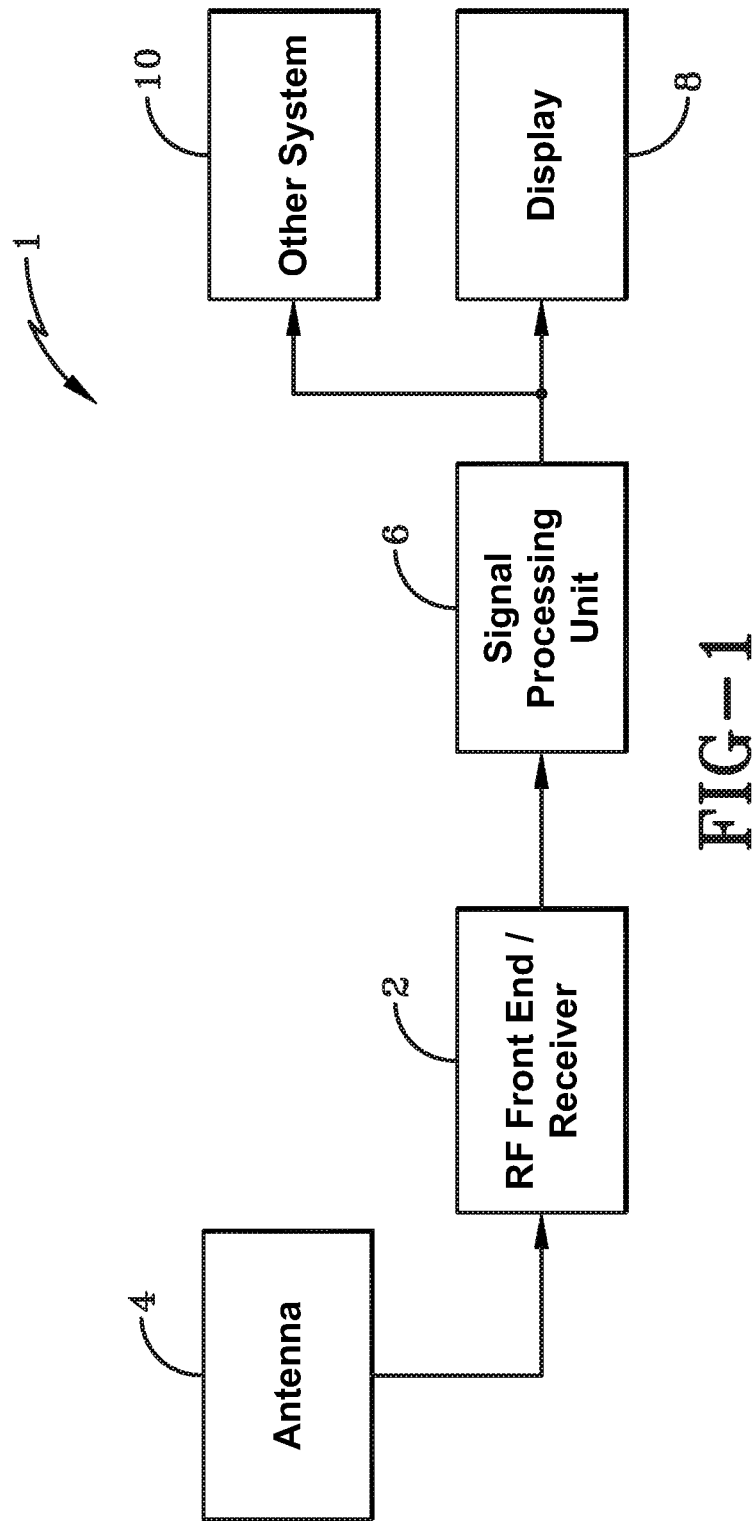
FIG. 1 is a diagrammatic view of a data collection and processing device or spectrum sensor which may be used to effect the various methods described herein.

A data collection and processing device or spectrum sensor is shown generally at 1 in FIG. 1 and is in a broad sense configured to sample, detect and classify radio frequency signals.

Device 1 may include a radio frequency (RF) front end/receiver 2 in communication with one or more antennae 4, a signal processing unit 6 in communication with the front end/receiver 2, and a display 8 in communication with the signal processing unit 6.

Device/sensor 1 may also include or be in communication with another system 10, which may be in communication with the signal processing unit 6. It will be understood by one skilled in the art that device/sensor 1 may be configured in any suitable form capable of effecting the various methods described herein.

RF front end/receiver 2 essentially provides a receiver function and is capable of tuning to a certain frequency band and collecting the signal over a certain desired bandwidth. Front end/receiver 2 may include an analog to digital (A/D) converter for converting the analog signal to a digital signal. Front end/receiver 2 may also include an automatic gain control circuit for automatically controlling the gain of a given signal.

Signal processing unit 6 is configured for signal processing that contains the spectrum sensing algorithms discussed in greater detail further below. Processing unit 6 may include a computer program stored on or run by hardware or software for implementing this signal processing, such as on a general purpose processor. The hardware may, for instance, be or include one or more of digital signal processing (DSP), a field programmable gate array (FPGA), an application specific integrated circuit (ASIC), and a graphics processing unit (GPU).

Display 8 is configured to display information received from unit 6. For instance, display 8 may display signals that are detected/classified (as discussed further below) and communicated to display 8. Display 8 may be any type of display known in the art, for example, a computer display/monitor, a cell phone display, a personal digital assistant (PDA) display and so forth.

Other system 10 may have any variety of configurations which may receive pertinent information from unit 6 for various purposes. Spectrum sensing provided by signal processing unit 6 to system 10 can provide value added information to system 10 for its operation in many cases. For example, other system 10 may include a cognitive software defined radio (SDR) system whereby processing unit 6 communicates to the SDR system where unused spectrum is, so that this cognitive radio system may use that unused spectrum for communications purposes. System 10 may also receive information from unit 6 for such applications as, for example, quantification of the available spectrum through spectrum observatories, on-demand spectrum survey and report, collaborative spectrum measurement and calibration, labeling of systems utilizing the spectrum, spectrum planning, spectrum mapping, coverage analysis for wireless deployment, terrain and topology—shadowing and fading analysis, complementing the database access for spectrum sharing by adding in-situ awareness and faster decision making, Space-Time-Frequency spectrum hole identification and prediction where non-time-sensitive tasks can be performed at certain times and at certain locations when the spectrum use is sparse or non-existent, and identification and geo-location of interference sources, etc.

The system and method(s) herein provide novel tunnelized second and higher-order cyclostationary processing algorithms to simultaneously detect and characterize signals. As previously noted, techniques that exploit second and higher order cyclostationarity features to detect and classify signals are highly desirable. However, their pervasive use and hardware implementation have been hampered because such algorithms are highly complex, and consume a lot of energy. The inventors have discovered that severe but purposeful under-sampling of the signals through tunneling (explained herein) preserves the cyclostationarity of the signals, even when the tunnel bandwidth is much smaller than the signal bandwidth. This phenomenon is then exploited to create a low complexity and flexible suite of algorithms to simultaneously detect and classify or characterize the signals using their cyclostationary features. As demonstrated herein, such algorithms can detect and characterize signals under a highly adverse signal to interference plus noise ratio, even when multiple signals are co-channel and simultaneously interfering with each other.

In general, any spectrum sensing related processing involves some form of data collection device or spectrum sensor such as device/sensor 1. As partially discussed above, this data collection device may include one or more antennas, radio frequency (RF) receivers that tune to a particular frequency, followed by amplifiers and mixers to amplify and down-convert the signal for processing, and finally analog to digital (A/D) converters that sample the analog signal at a nominal sampling frequency and digitize them for processing. This processing that happens in general for any spectrum sensor is well understood. The focus of our invention is the processing that happens on this digitized data to further understand what kind of signals are actually operating in the analysis bandwidth, as well as a system, apparatus or device/sensor 1 which is configured to effect this processing/the method(s) described herein. The analysis bandwidth is defined as the total bandwidth which needs to be analyzed by the spectrum sensing algorithms at a time. Typically, the analysis bandwidth is less than or equal to the sampling rate (fs) to meet the Nyquist criteria. Device/sensor 1 may be used to effect method(s) herein which may include under sampling an input signal to take samples in one or more tunnels each with a tunnel bandwidth that is equal to or less than a total analysis bandwidth of the input signal; detecting one or more cyclostationary features of the input signal based on the samples; and determining one or more signal types of the one or more cyclostationary features based on the one or more cyclostationary features.

Figure 2:
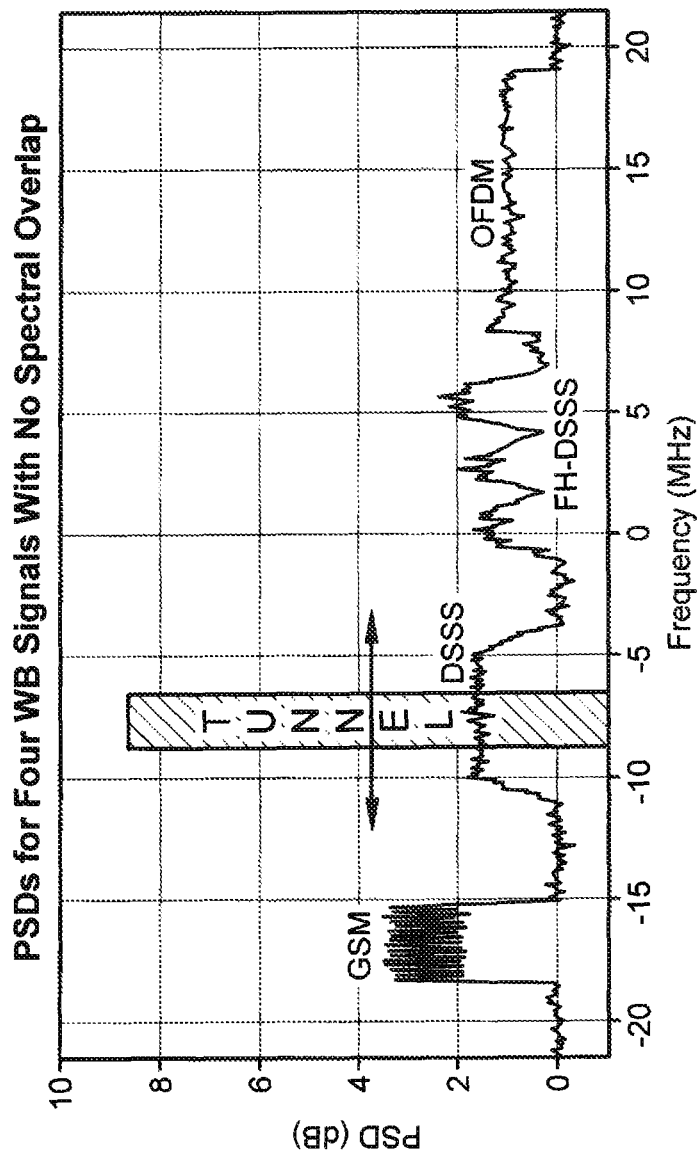
FIG. 2 is a graph which illustrates the concept of tunneling.

FIG. 2 illustrates an embodiment of the concept of "tunneling", which is purposeful under sampling of the analysis bandwidth spectrum into smaller sub-bands called tunnels. These tunnels could be a result of a simple channelizer circuit, or of something more sophisticated such as compressive sensing or sampling. In particular, FIG. 2 shows the power spectral density (PSD) for four wideband signals with no spectral overlap. The four wideband signals shown as examples are respectively Global System for Mobile (GSM), Direct sequence spread spectrum (DSSS), frequency hopping and direct sequence spread spectrum (FH-DSSS) or (FH/DS SS), and orthogonal frequency division multiplexing (OFDM).

Figure 3A:
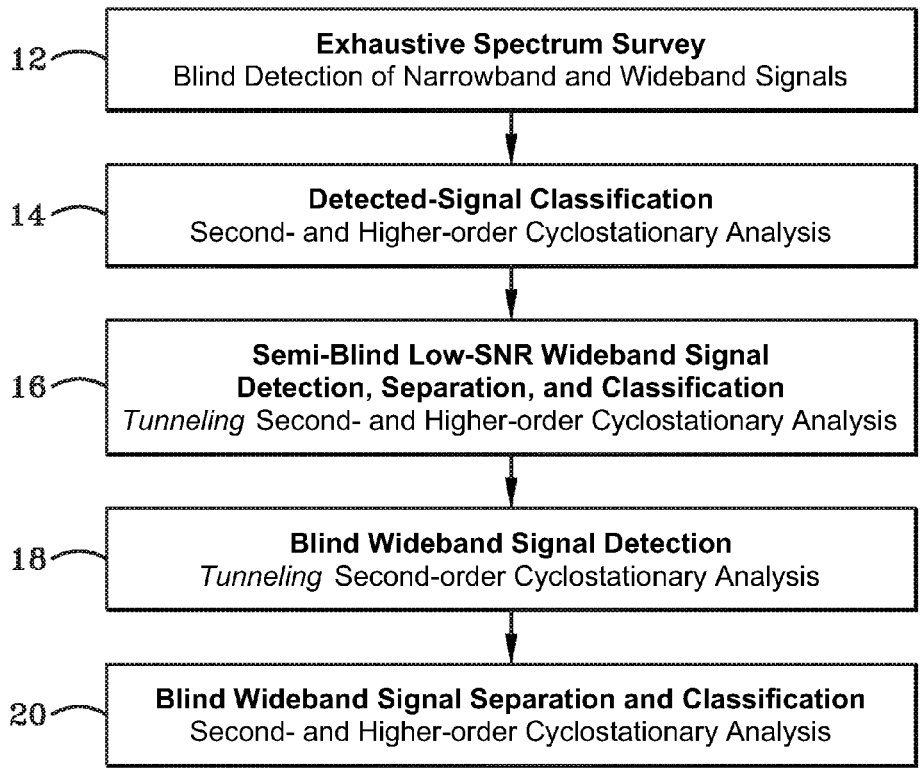
FIG. 3A is a flow diagram showing signal processing flow for known and unknown signal detection and characterization.

The invention provides computationally efficient cyclostationary detection and classification algorithms which do not require processing of full signal bandwidth. As shown in FIG. 2, we formulated this novel approach called "tunneling" where we discovered that severely under-sampled signals (although distorted) retain exploitable cyclostationary properties where these tunnelized signals can be detected and characterized with the same performance as traditional cyclostationary algorithms. The exploitable cycle frequencies (CFs) in spite of tunneling are manifested as a result of repeating features of the signal that originate from the structures associated with frame size, packet size, preamble structure, pilot patterns and hop patterns, as well as fast moving features that are associated with symbol rate or chip rate. FIGS. 3A and 3B describe the signal processing flow for the tunnelized cyclostationary processing to detect known and unknown signal types.

The ability of the tunnelized cyclostationary algorithms to provide energy savings of greater than ten times that of conventional cyclostationary algorithms comes from the fact that instead of analyzing a high sample rate input signal stream, one can now process a severely sub-sampled tunnelized signal stream and apply striding, where not all the tunnels are analyzed, but instead many of them are skipped at no penalty in performance.

FIGS. 3A and 3B show the signal processing flow of the Cognitive radio Low-energy signal Analysis Sensor Integrated Circuit (CLASIC) algorithms. The CLASIC algorithms are implemented in five stages such that the sophistication and complexity of the algorithms increase with each stage. The various stages are labeled in FIG. 3B and shown respectively at blocks 12, 14, 16, 18 and 20 in FIG. 3A. In Stage 1 (block 12), channelization or tunneling is conducted, and an exhaustive spectrum survey is also conducted to detect (blind detection) all types of signals (narrowband and wideband) that are well above the noise floor. In Stage 2 (block 14), narrow-band signals are detected and characterized using second and higher order cyclostationary processing. In Stage 3 (block 16), known types of signals are detected and characterized using their second order cyclostationary properties. This may involve semi-blind low-SNR wideband signal detection, separation and classification based on second and higher order cyclostationary analysis. Stage 4 (block 18) of the process is used to detect unknown types of signals and find the detected frequency interval (DFI) which is an approximate frequency support of the signal. This may involve blind wideband signal detection and second order cyclostationary analysis. Stage 4 results are passed on to Stage 5 (block 20), which serves to detect and characterize the unknown signal type using second and higher order cyclic cumulants (HOCCs). This may involve blind wideband signal separation and classification based on second and higher order cyclostationary analysis.

Stage 1—Tunneling the Input Sample Stream

The function of Stage 1 is to perform tunneling of the input data stream. In Stage 1, device/sensor 1 may be used to under sample an input signal to take samples in one or more tunnels each with a tunnel bandwidth that is equal to or less than a total analysis bandwidth of the input signal. A channelizer may be used with a sufficiently long window to create enough isolation between tunnels to be able to withstand interference from other higher power signals, which may be signals with highly dynamic characteristics. For example, the channelizer may be a polyphase windowed discrete Fourier transform (DFT) channelizer. The polyphase windowed DFT channelizer may be followed by an energy detection stage performed by applying a block averaging circuit to each tunnel over time to obtain accurate estimates of the noise floor of the given tunnel and hence detect signals that are sufficiently above the noise floor to perform rapid analysis of the RF scene. This is equivalent to performing Energy Detection (ED) for the spectrum, with frequency resolution equal to the bandwidth of the given tunnel. Finally, tunnelized signals are provided to a whitener circuit, which performs the function of creating a level playing field for all signals and normalizes it to an average amplitude of unity, no matter what their input received power may be, which allows signals with a wide variety of cyclostationary properties to be detected without causing false alarms or missed detection for other signals. The other advantage of the whitener is to scale the signal without losing any information which ensures that the maximum or the minimum bit-widths for digital signal processing (DSP) in hardware implementation do not go out of proportion, even when the signal suffers from excessive low or high swings. If this step is skipped, then it is difficult to set a particular threshold when a wide variety of signals need to be analyzed.

Stage 3—Simultaneous Detection and Characterization of Known Type of Signals

Figure 3C:
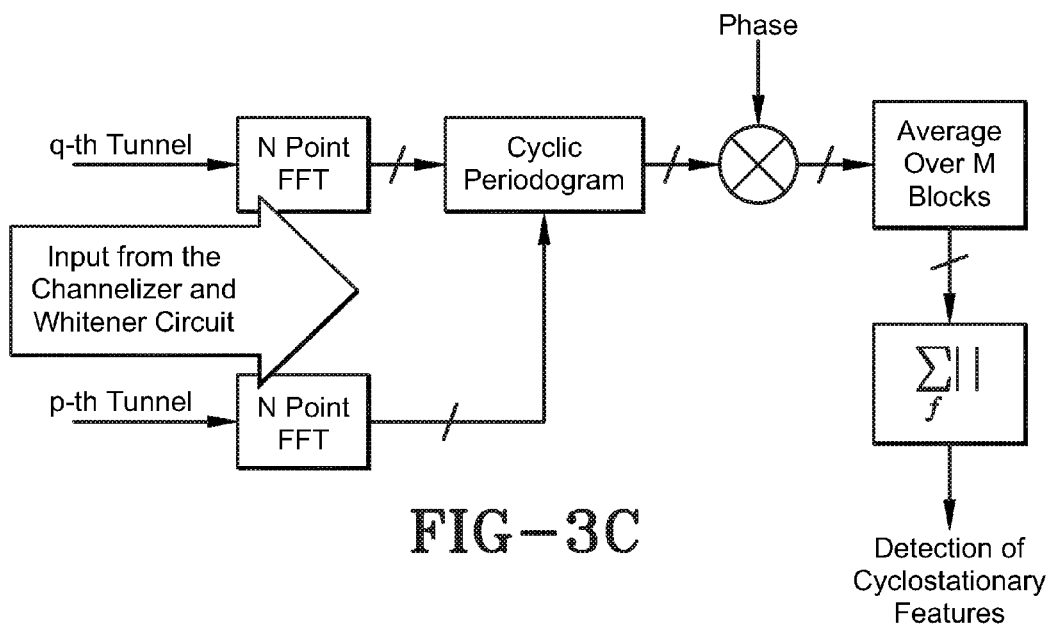
FIG. 3C is a flow diagram showing Stage 3 spectral correlation function estimation for known type signal types using their known or previously estimated cycle frequencies.
Figure 3B:
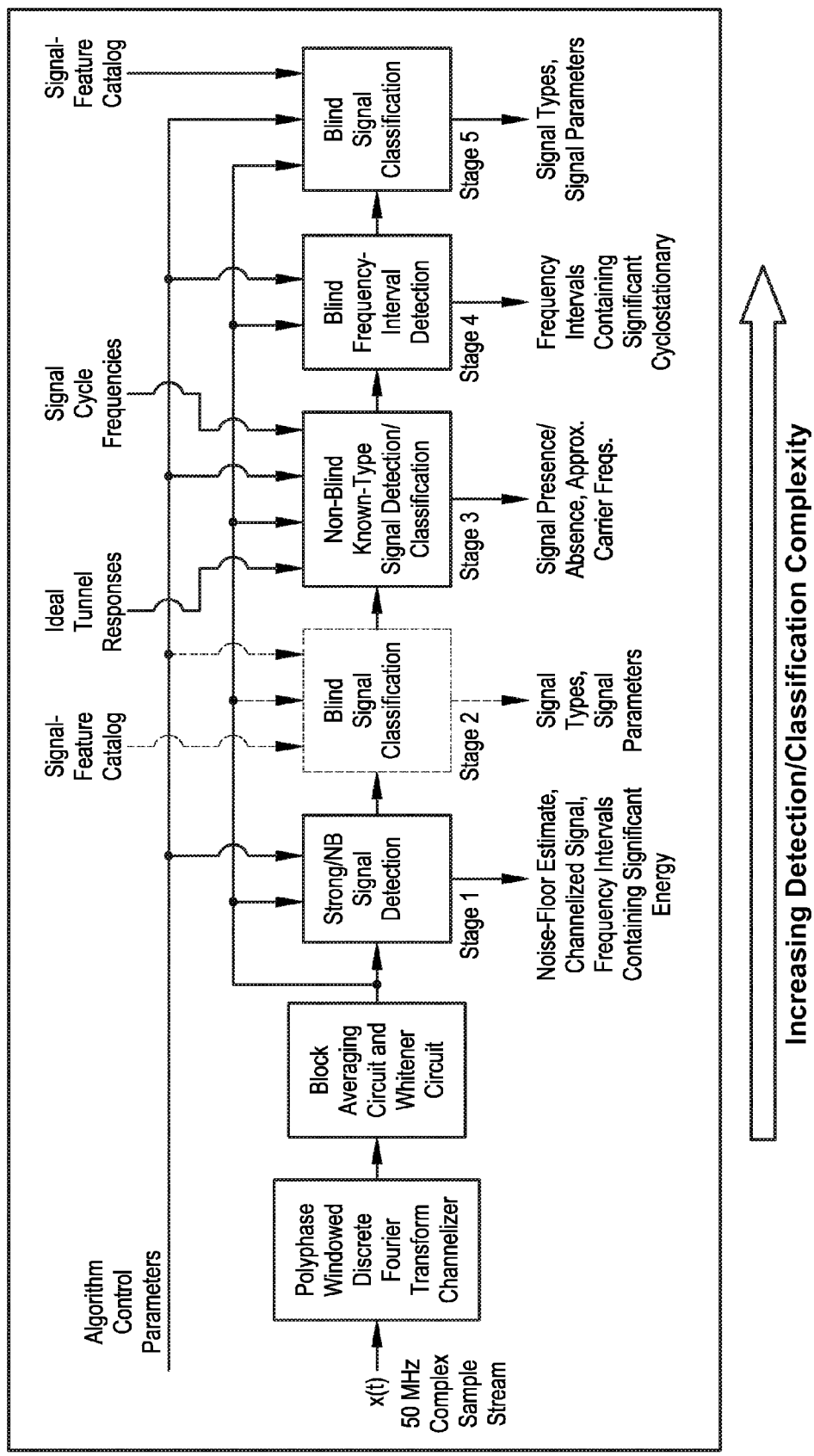
FIG. 3B shows another instantiation of the signal processing flow.

FIG. 3C is a flow diagram showing Stage 3 spectral correlation function estimation for known type signal types using their known or previously estimated cycle frequencies.

The function of Stage 3 is to perform detection and characterization of known types of signals using their known or previously estimated cycle frequencies (CFs). The primary algorithm that is used to determine the cyclostationary property of the signals is given by the well-known Equations (1) below that represent the cyclic periodogram for the $p^{th}$ tunnel and processing of N samples for a given CF $\alpha$, and for the frequency support f. Xp and Xq correspond to the discrete Fourier transforms (DFT) of the whitened signals for the pth tunnel and the qth tunnel respectively. FFTN( ) denotes N point Discrete Fourier Transform (DFT) processing. $X_{p,N}$ and $X_{q,N}$ correspond to the $p^{th}$ and $q^{th}$ tunnel signals after DFT processing. Parameter $\alpha$ is cycle frequency, parameter f is support frequency and parameter M is the number of blocks with each block containing N point DFT output. $I_{x_p x_q}^{\alpha}$ is the general spectral correction function with cycle frequency $\alpha$ and is obtained by $p^{th}$ and $q^{th}$ tunnel signals. $S_{x_p x_q}^{\alpha}$ is the spectral correction function after time smoothing by averaging M coherent cyclic periodograms.

$$X_{p,N}(k, f) = FFTN(x_p(t - kN))$$

$$I_{x_p x_q}^{\alpha}(k, f) = X_{p,N}\left(k, f + \frac{\alpha}{2}\right) X_{q,N}^{*}\left(k, f - \frac{\alpha}{2}\right)$$

$$\hat{S}_{x_p x_q}^{\alpha}(f) = \frac{1}{NM} \sum_{k=0}^{M-1} I_{x_p x_q}^{\alpha}(k, f) e^{-i2\pi\alpha kN}$$

Equations 1

The cyclic periodogram, when averaged over many data records, with a valid phase factor, produces an estimate of the spectral correlation function (SCF) which has the (f,$\alpha$) support (also known as the principal domain) that resembles a diamond.

Figure 4A:
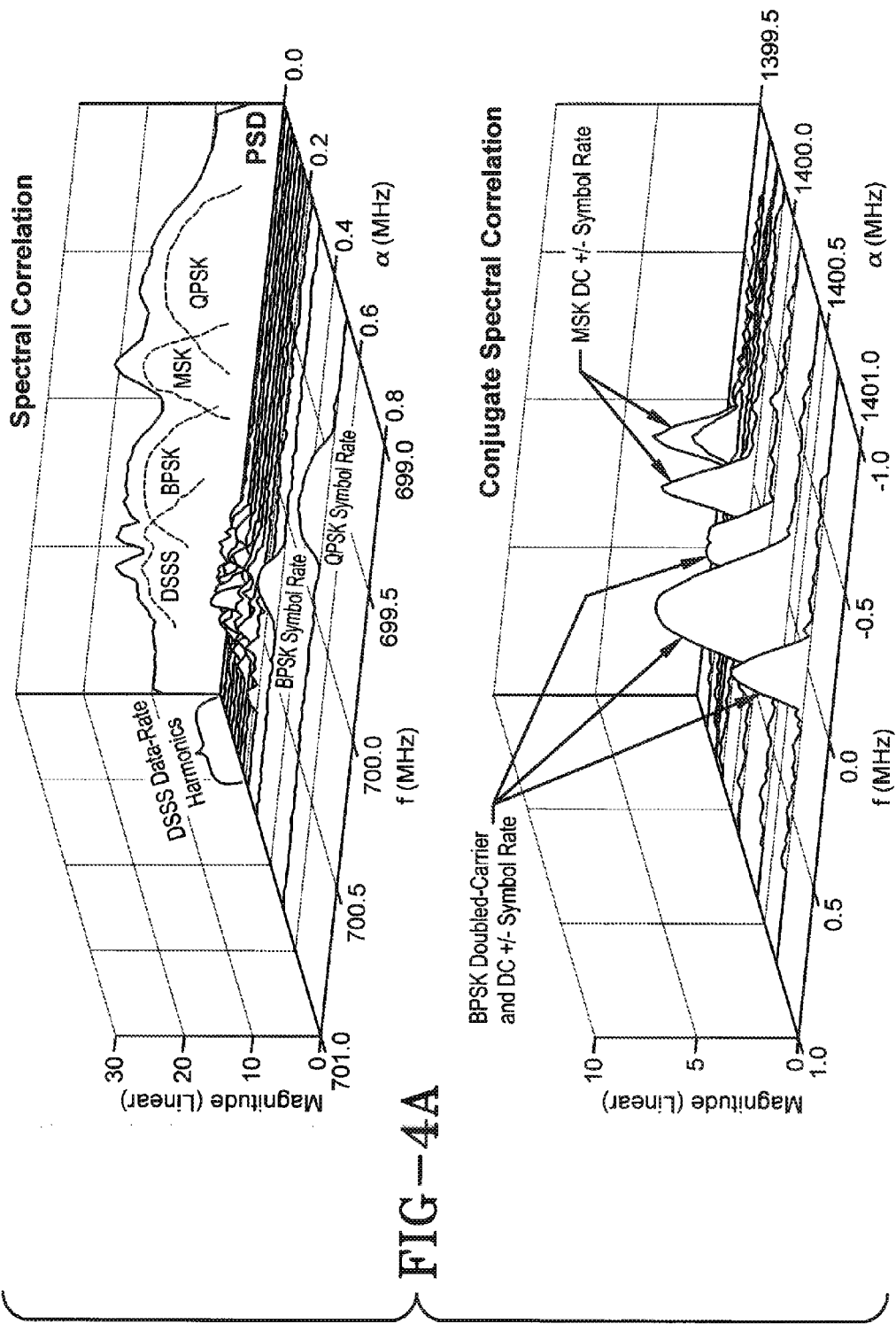
FIG. 4A illustrates Non-conjugate and the Conjugate Spectral Correlation Functions (SCF) for the entire analysis bandwidth.

FIG. 4A shows an illustration of the SCF of an entire or total analysis bandwidth. With reference to FIG. 4A, it is noted that all signals and noise contribute to the power spectrum ($\alpha$=0), but different signals contribute to different parts of the spectral correlation planes. What is difficult to detect and sort in the power spectral density (PSD) can be easy in the planes. Signal parameters reflected in spectral correlation can be estimated in the presence of interference.

Figure 4B:
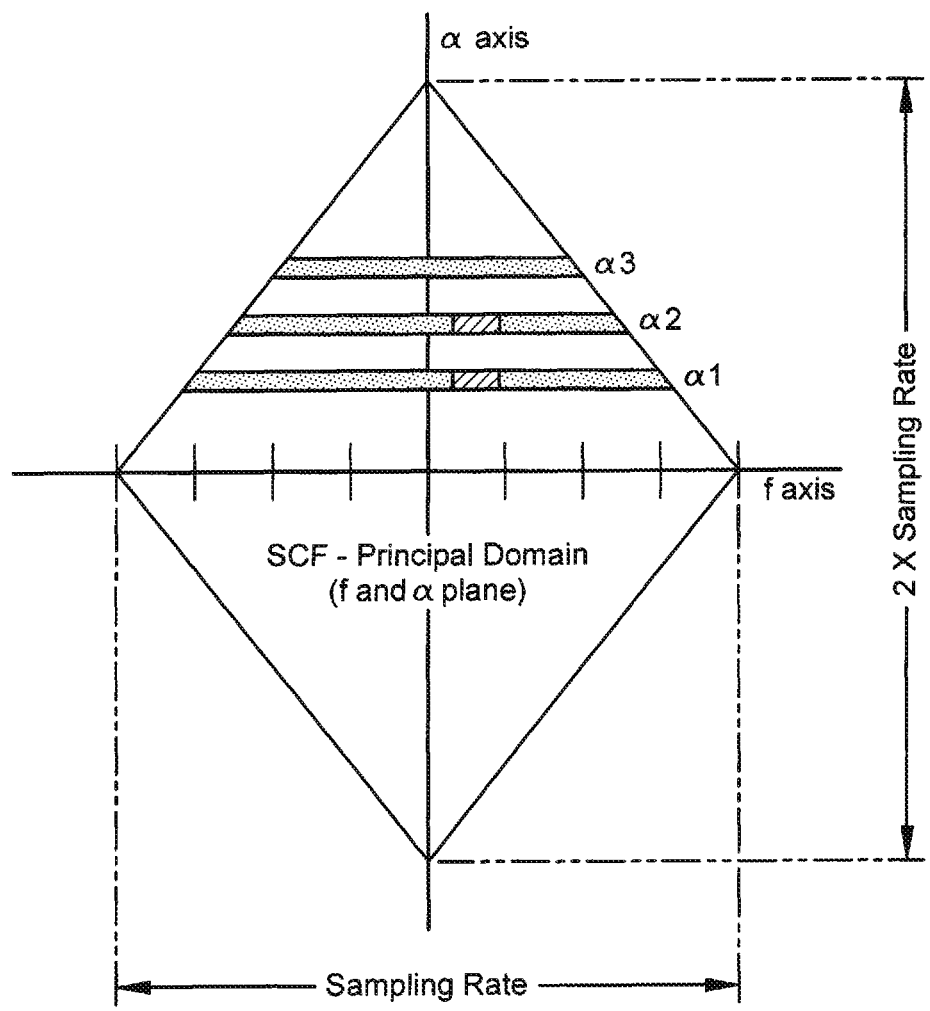
FIG. 4B is a graph showing non-conjugate spectral correlation function processing for known signal types, where the system only tries to detect certain known Cycle Frequencies (CF).
Figure 4C:
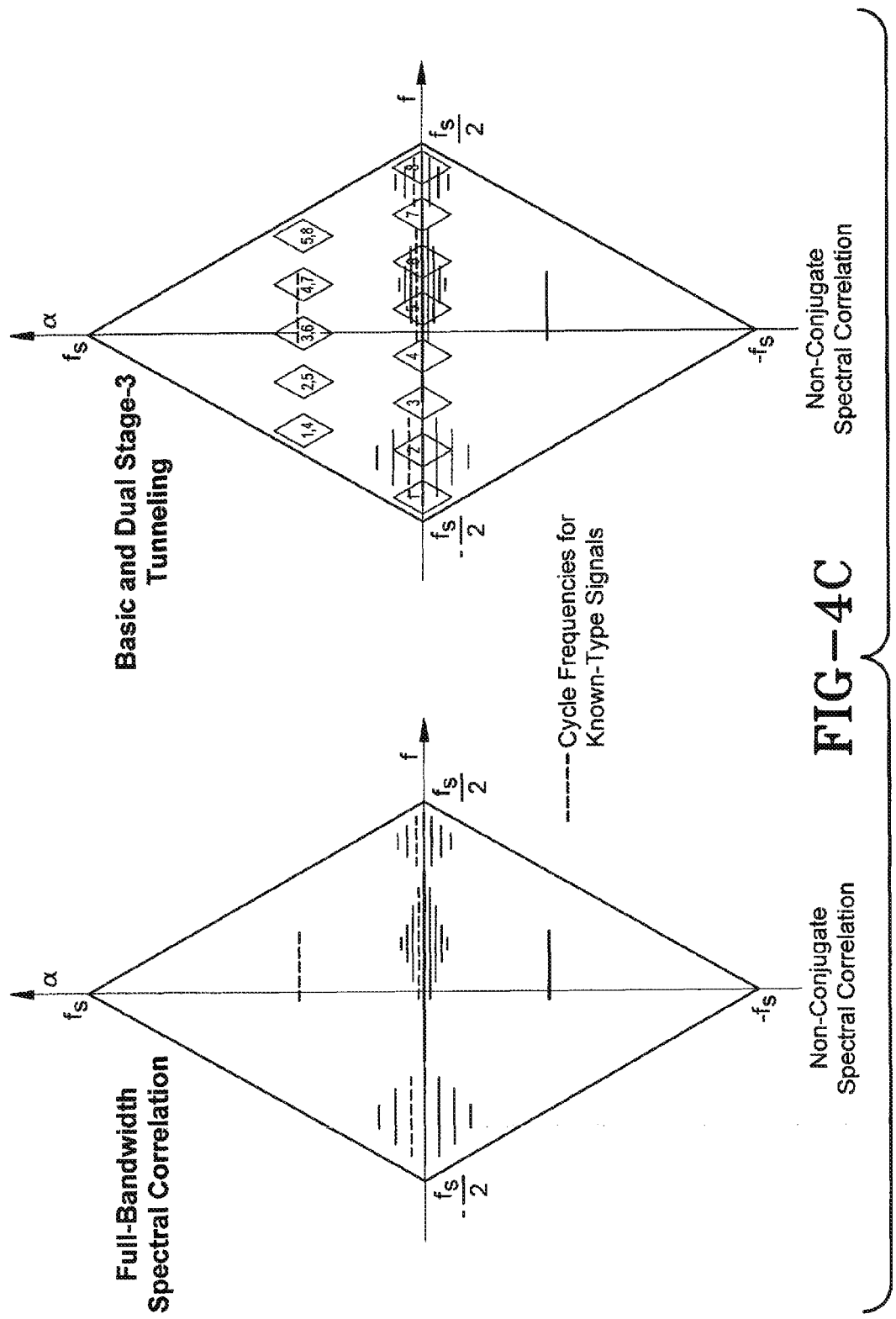
FIG. 4C further elaborates the difference between Basic Tunneling and Dual Tunneling where the Basic Tunneling is used to detect CFs less than or equal to the Tunnel Bandwidth (BW) and Dual Tunneling is used to detect CFs greater than or equal to the Tunnel BW.

FIG. 4B illustrates how we perform our Stage 3 processing to only detect certain known CFs for the signals that we wish to detect. As shown in FIGS. 4B and 4C, if the CF of a signal is known a priori, then it is not necessary to compute the SCF exhaustively. Rather, one can significantly reduce the complexity by simply looking for the SCF response for the known CFs and comparing the response against a threshold for noise and other signal types. This results in significant reduction in computational cycles involved. Further, as mentioned below, not all tunnels need to be analyzed for signals. Depending upon the size of the tunnels and the signals that need to be detected, we apply a striding factor, which allows a significant number of tunnels to be skipped without any performance penalty.

Three types of cyclostationary statistics are computed in Stage 3. "Basic" tunnel response corresponds to the processing where the CFs to be found are smaller than the tunnel bandwidth. Hence, both the Xp and the Xq terms in Equation (1) come from the complex baseband samples of the same tunnel, or in other words, p=q. As an example, a Wideband Code Division Multiple Access (WCDMA) signal contains strong CFs at 15 kHz, 30 kHz and 45 kHz, which in our case belongs to Basic tunnel processing. "Dual" tunnel response corresponds to the processing where the CFs to be found are greater than the tunnel bandwidth. Hence, both the Xp and the Xq terms in Equations (1) come from the complex baseband samples of two different tunnels, where the distance between the two tunnels is roughly equal to the CF that needs to be detected. As an example, a WCDMA signal that contains strong CFs at 3.8488 MHz would belong to Dual tunnel processing.

Both the Basic and Dual tunnel responses correspond to a non-conjugate cyclic periodogram, where a conjugate operation is applied for the Xq term in Equation (1). However, when this conjugate term is missed, and the CF to be detected is greater than the tunnel bandwidth, then it results in the statistic that is referred to as the "Dual Conjugate" as shown in Equation 2:

$$\hat{I}^\alpha_{x_p x_q^*}(t,f) = \frac{1}{N} X_{p,N}\left(t, f + \frac{\alpha}{2}\right) X_{q,N}\left(t, \frac{\alpha}{2} - f\right) \quad \text{Equation 2}$$

The dual conjugate is used to detect signals that have no known non-conjugate CFs (e.g., Advanced Television Standards Committee Digital Television or ATSC DTV signal), but contain CFs that are proportional to their carrier frequency and the symbol rate. As can be seen from Equation 2, not applying the conjugation factor retains the double carrier terms in the SCF.

Figure 5A:
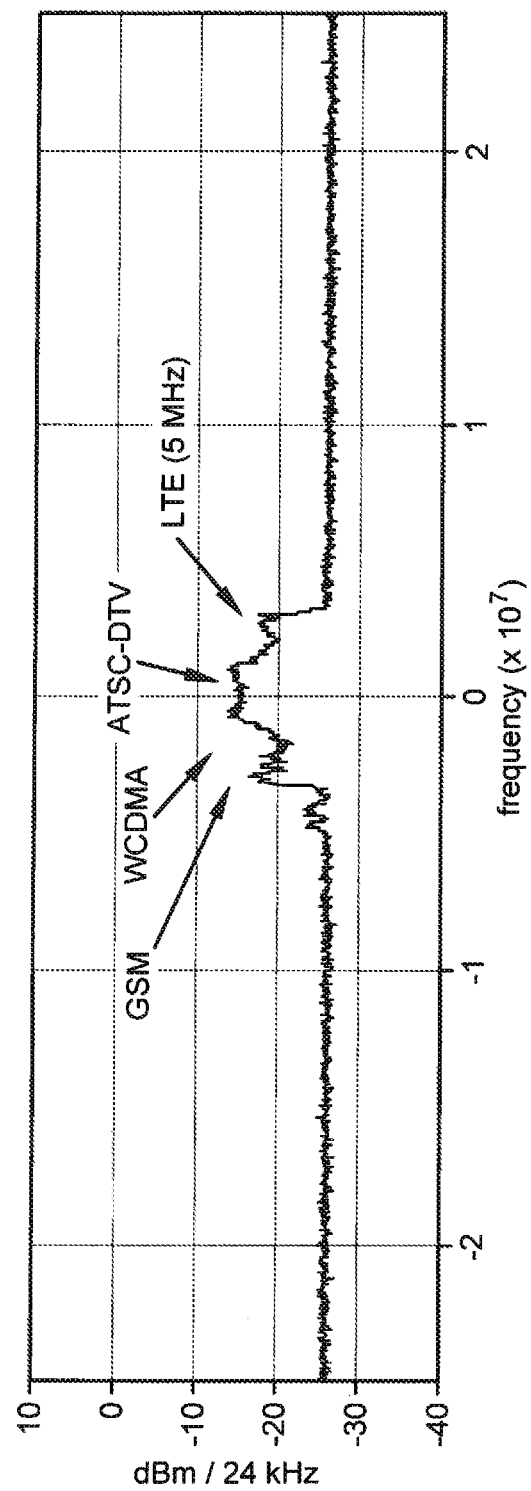
FIGS. 5A, 5B, 5C and 5D show graphs illustrating Stage 3 known type signal detection and characterization using "tunneling".
Figure 5B:
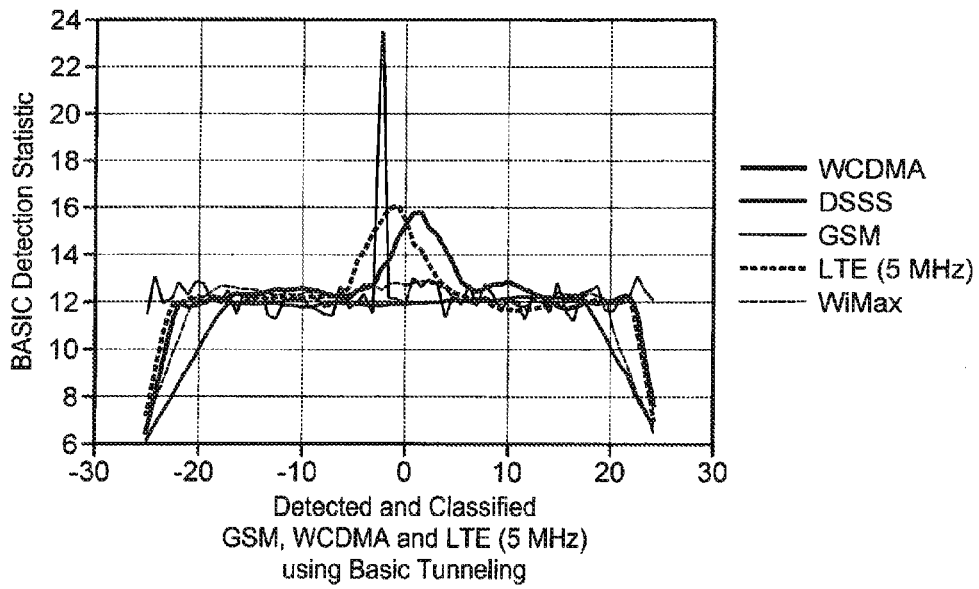
Figure 5C:
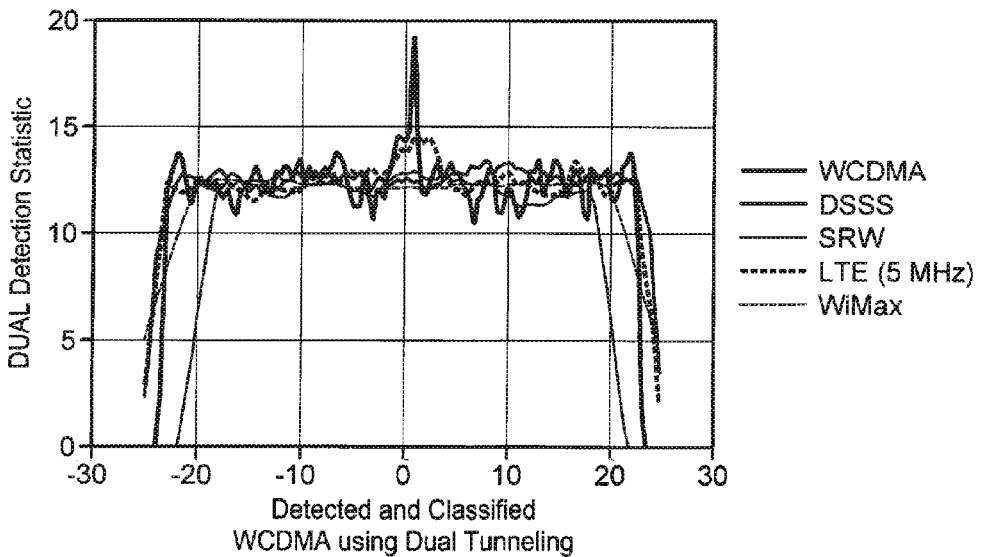
Figure 5D:
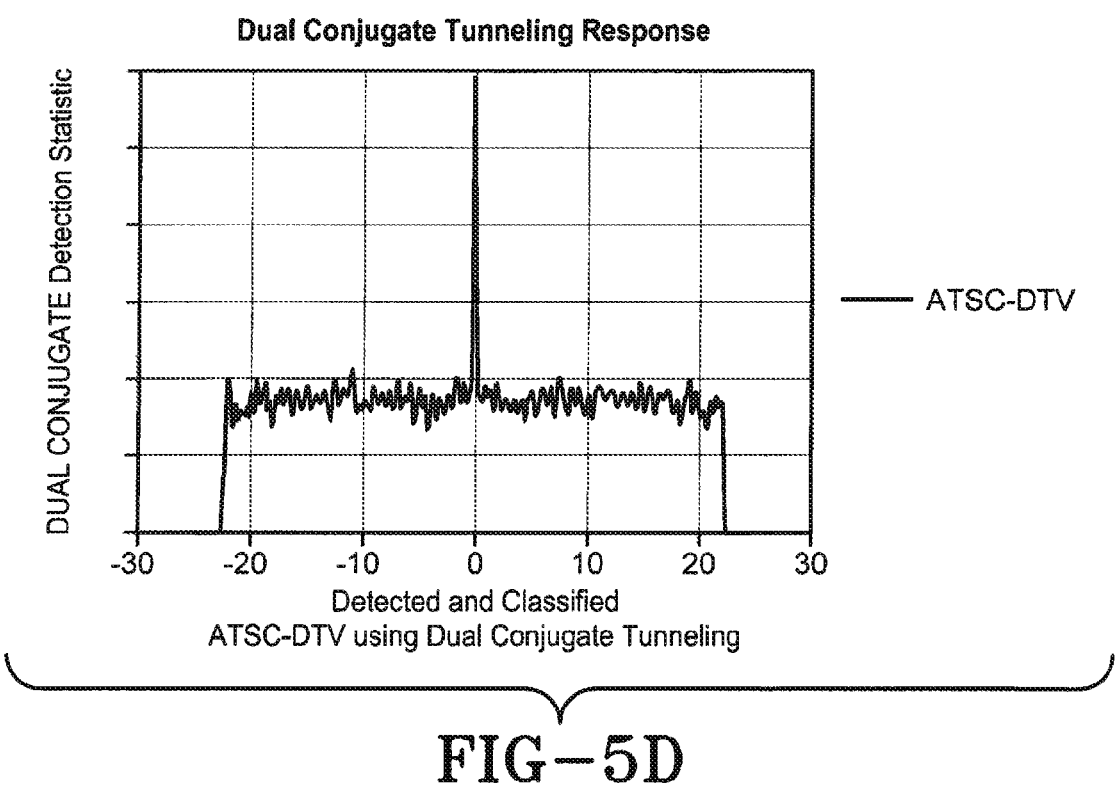

FIGS. 5A, 5B, 5C and 5D show one of the extraordinary results of the system and process presented herein. This is the case where five signals {viz. Global System for Mobile (GSM), Wideband Code Division Multiple Access (WCDMA), unknown type, Advanced Television Standards Committee—Digital Television (ATSC-DTV), 3$^{rd}$ Generation Partnership Project (3GPP) Long Term Evolution (LTE) (5 MHz)} are co-channel and interfering with each other, as shown in FIG. 5A. Using Basic tunnel processing (FIG. 5B), Dual tunnel processing (FIG. 5C) and Dual Conjugate tunnel processing (FIG. 5D), it is possible to detect and classify all the known type signals in spite of them being right on top of each other and in extremely poor signal to interference plus noise ratio (SINR) environment. The FIG. 5A graph illustrates basic tunnel based detection and classification, and more particularly shows detection and classification of GSM, WCDMA and LTE5M using basic tunneling; the FIG. 5B graph illustrates dual tunnel based detection and classification, and more particularly shows detection and classification of WCDMA using dual tunneling; and the FIG. 5C graph illustrates dual conjugate tunnel based detection and classification, and more particularly shows detection and classification of ATSC-DTV using dual conjugate tunneling.

Table I illustrates the confusion matrix for the scene represented in FIGS. 5A-5D for 100 trials, where each signal had an in-band signal to noise ratio (SNR) of 3 dB. As can be seen from Table I, the proposed tunnelized cyclostationary algorithms are able to detect and characterize the signals with nearly ideal performance.

TABLE 1

STAGE 3 DETECTION AND CHARACTERIZATION-CONFUSION

| | | Classified As: | | |
|---|---|---|---|---|
| In-band SNR = 3 dB | WCDMA | GSM | LTE (5 MHz) | DTV |
| Input Signal  WCDMA | 100% | | | |
| GSM | | 100% | | |
| LTE (5 MHz) | | | 100% | |
| DTV | | | | 100% |

Some other things of note are that, during experimentation, the inventors were able to create significant reduction in computational footprint by using partial fast Fourier transform (FFT) points for Signals Xp and Xq in Equations (1) and (2). As an example, the FFT size may be 16, the analysis bandwidth may be 50 MHz which when divided into 256 tunnels results in each tunnel having a bandwidth of 195.3125 kHz each. The spectrum sensing time for the results shown in FIGS. 5A-D and Table I was 160 milliseconds (ms), or approximately $2^{23}$ samples if the sampling rate (Is) is 50 MHz.

IV. Stage 4—Unknown Signal Detection

Stage 4 includes unknown type of signal detection and detected frequency interval (DFI) computation. This is accomplished using both cyclostationary processing and energy detection. Since it is not possible to know the characteristics of the unknown signal, an exhaustive CF search for the tunnels is performed. The criteria used is to detect at least one CF in a given tunnel. FIG. 6A illustrates the concept of Stage 4 unknown signal type detection where tunnels with similar CFs are grouped together to create a DFI, which is then provided to the Stage 5 processing for further analysis.

Computing the spectral correlation function (SCF) using Equations (1) and (2) is efficient when the CFs are known a priori, but not very efficient when one does not know the CFs, as disclosed by W. A. Brown and H. H. Loomis, Jr., in *Digital Implementations of Spectral Correlation Analyzers, IEEE Transactions on Signal Processing*, Vol. 41, No. 2, February 1993, pp. 703-720.

The below-noted algorithm, which is extremely hardware friendly, divides the 2-D (f,α) plane into diagonally arranged strips as shown in FIG. 6B, which for instance shows a strip 6 and a strip 8 (of eight strips into which the plane might, for example, be divided). Once again, it is not necessary to analyze each and every strip in each and every tunnel. In the majority of cases, a few strips are enough to detect the signal with reasonable probability of detection (Pd) and probability of false alarm (Pfa).

The generic strip spectral correlation analyzer (SSCA) algorithm may be described using the following Equations (3):

$$\hat{S}^\alpha_{x_N}(f) = \sum_{r=0}^{N-1} X_{N'}\left(r, f + \frac{\alpha}{2}\right) x^*(r) e^{-i2\pi r\left(\frac{\alpha}{2}-f\right)} \quad \text{Equations (3)}$$

$$X_{N'}(r,f) = \sum_{j=-N/2}^{\frac{N'}{2}-1} a(j) x(r-j) e^{-i2\pi f(r-j)}$$

where two fast Fourier transforms (FFTs) of respective sizes N' and N (i.e., a first size FFT N and a second size FFT N)

are used or defined, wherein N is the data length or spectrum sensing length, and N' is a smaller than N and may be much smaller than N. $\hat{S}_{x_p x_q}{}^\alpha$ is a strip spectral correction function obtained by N samples. α is cycle frequency and f is support frequency. x(r) is a time domain signal being processed and a(•) are the coefficients of data-tapering window respectively. FFT N' may also be called a channelizer. All this results in a comprehensive computation of the spectral correlation function over the (f,α) principal domain. FIG. 6A shows the implementation of the SSCA using N' point and N point FFTs. Two input sample streams are provided to the SSCA. If the sample streams originate from the same tunnel, i.e., when k=p, the resultant SSCA is termed as Auto SSCA. When kth and pth whitener outputs to the SSCA come from two different tunnels, then the resulting SSCA is termed as the Cross SSCA. Stage 4 may use Auto or Cross SSCA. Stage 5 uses both the Auto and the Cross SSCA computation. For example, N' may be 8, N may be $2^{15}$ or approximately 32,000 samples, which corresponds to approximately 160 ms of sensing at 50 MHz of sampling and 256 tunnels.

Referring to FIG. 6A, a regularly spaced set of tunnels may be used with S>1. For each visited tunnel, the full non-conjugate SCF may be computed using the SSCA algorithm. Significant CFs may be detected using the spectral coherence statistic. Spectral bands containing non-noise energy may be identified by grouping together adjacent (modulo striding) tunnels containing CFs. The signal at 28 in FIG. 6A will be detected, whereas the signal at 30 in FIG. 6A will be missed. FIG. 6A shows at 32 intervals which may be blindly estimated. To blindly estimate cycle frequencies that indicate the presence of non-noise RF energy, spectral correlation analysis is applied to a set of sparsely sampled tunnels, resulting in the subdiamonds near the frequency axis in the left plot of FIG. 6A. The SSCA is used to exhaustively analyze all the cycle frequencies that can appear in each subdiamond shown in the left plot of FIG. 6A.

Figure 7A:
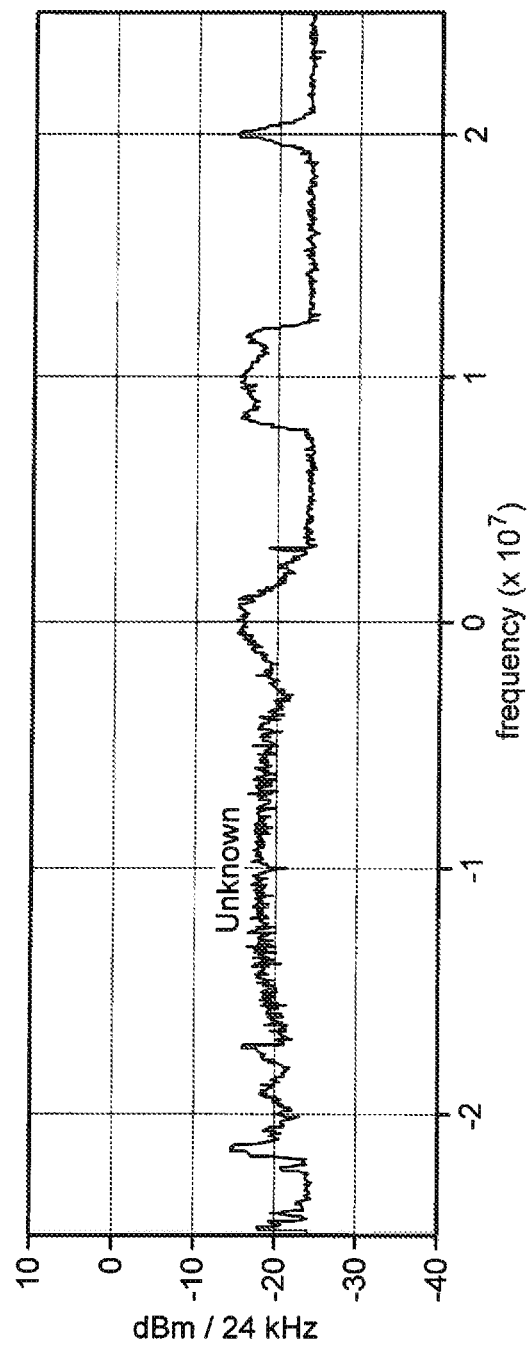

FIGS. 7A, 7B and 7C illustrate the performance of the Stage 4 processing using Basic or Auto SSCA processing for a single strip. The graph in FIG. 7A illustrates the input scene with an unknown signal type. The graph in FIG. 7B illustrates the number of new CFs detected for the tunnels occupied by the unknown signal type, and more particularly shows at 22 detected frequency intervals (DFI) with similar CF content, and at 24 that ATSC video carrier and GSM show very strong CF content. The graph in FIG. 7C illustrates the DFI region, which is the region that is further subjected to Stage 5 processing for further analysis. The graph in FIG. 7C shows at 26 the unknown signal and its region of support detected using Stage 4 processing.

Figure 8A:
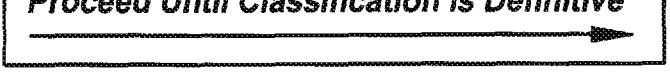
FIG. 8A shows Stage 5 processing using second and higher order cyclostationary processing where Stage 5 has been further broken down into Levels 0 to 3.

Stage 5—Unknown Signal Characterization Using Second and Higher Order Cyclic Cumulants Stage 5 is the most complicated stage of our CLASIC circuit since it needs to process the DFI regions for unknown signal types provided by Stage 4, and not only characterize the signal type, but also identify its modulation. Hence, the Stage 5 processing is broken down into four levels (0, 1, 2 and 3) as shown in FIG. 8A. Although Stages 1 through 4 as well as Stage 5 Level 0 and 1 are processed after tunneling, it is not necessary to perform tunneling for Stage 5 Level 2 and 3. Stage 4 provides the estimate of the carrier frequency and the DFI of the detected signals to Stage 5, where the Second and Higher Order analysis is then performed on a portion of the band that is known to contain the signal.

Figure 8B:
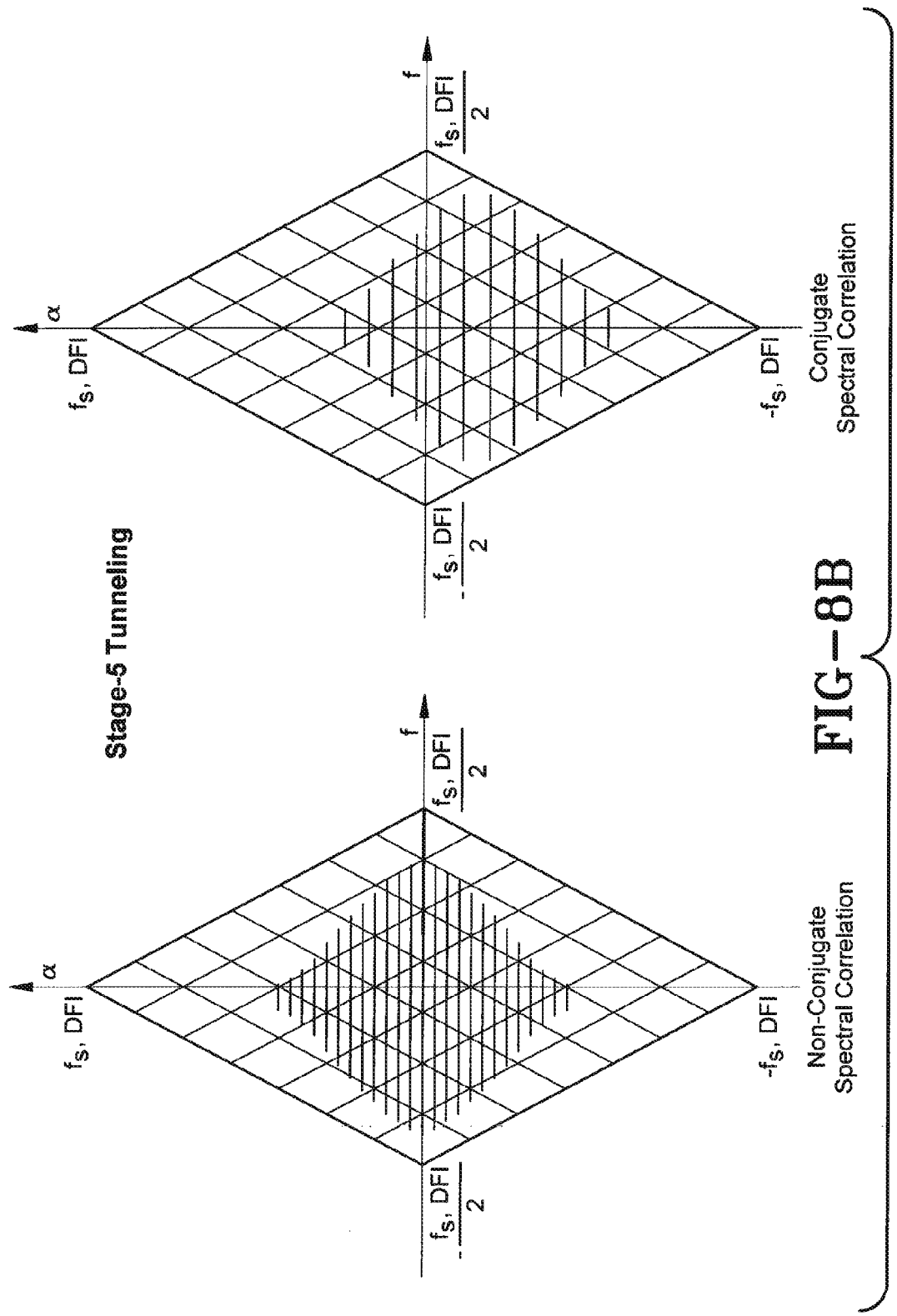
FIG. 8B shows the process of further analyzing the DFI by analyzing the principal domain by dividing it into sub-diamond regions.

FIG. 8A illustrates the details of Stage 5 Levels 0 through 3 and how these Levels are used to provide signal characteristics understanding from the lowest fidelity to the highest fidelity. FIG. 8B shows the process of further analyzing the DFI by analyzing the principal domain by dividing it into smaller diamonds or subdiamonds or subdiamond regions (here, 49 subdiamonds). FIG. 8B illustrates that one way to obtain the CF pattern is exhaustive estimation of SCF using only tunnels that span the DFI. If all subdiamonds are analyzed by performing cross spectral correlation analysis for all possible pairs of tunnels, the subdiamonds will tile the DFI's principal domain, as shown in the left plot or graph of FIG. 8B. A similar analysis can be performed for the conjugate spectral correlation function, again using all possible tunnel pairs, as illustrated in the right plot or graph of FIG. 8B.

FIG. 8C illustrates that not all the subdiamond regions need to be analyzed for blind classification of the unknown types of signal. Thus, a selected subset of tunnels may be analyzed to infer the CF pattern. For example, the non-conjugate spectral correlation graph on the left of FIG. 8C shows that 19 of the 49 subdiamonds of FIG. 8B may be analyzed for this purpose, and the conjugate spectral correlation graph on the right of FIG. 8C shows that 15 of the 49 subdiamonds of FIG. 8B may likewise be analyzed. Use of only some tunnel pairs in the cross spectral correlation analysis can still provide sufficient information to detect and classify most RF signals. FIG. 8C shows a particular sampling of all possible tunnel pairs for both the non-conjugate and conjugate spectral correlation function. This particular sampling places subdiamonds in regions near the frequency and cycle frequency axes, which are the regions mostly likely to contain important cycle frequencies.

Stage 5 Levels 0 and 1 correspond to characterizing the unknown type of signal utilizing exhaustive second order SCF analysis using SSCA. Unlike Stage 4, this analysis is much more exhaustive and involves not only computing all the CFs, but also their patterns. The SCF for any CF in the original high-rate data can be estimated from tunnels by using appropriate auto or cross SCF estimators. Auto non-conjugate SCF estimates cover the CFs near the frequency axis. Auto conjugate SCF estimates cover the CFs near the CF axis. Cross SCF estimates fill in the remainder of the two diamonds. This has been illustrated using FIG. 4C.

The large diamond on the left of FIG. 4C illustrates the wideband data scenario; this is the aerial view of the spectral correlation function for the wideband data prior to tunneling. The lines inside the diamond indicate cycle frequencies for various signals. The cycle frequencies that are known in advance of processing are shown by dashed lines. The large diamond on the right of FIG. 4C illustrates basic and dual tunneling. Each subdiamond on the plot represents the spectral correlation function that can be estimated by performing a cross spectral correlation analysis between two tunnels. If all pairs are considered, the large diamond is tiled by the smaller diamonds. The indices inside the subdiamonds indicate the involved tunnels, assuming that there are eight tunnels total. A single number indicates that the cross operation defaults to an auto operation. The Basic Tunneling employs only tunnel pairs that result in the subdiamonds near the frequency axis; this applies to all known cycle frequencies that have magnitude less than the tunnel bandwidth. On the other hand, Dual Tunneling employs other pairs of tunnels, resulting in the subdiamonds shown well above the frequency axis.

Stage 5 Levels 2 and 3 conduct further analysis to separate the modulations of various signal types.

For example, as shown in FIG. 8A, 16-QAM (quadrature amplitude modulation) and π/4 DQPSK (differential quadrature phaseshift keying) have identical second order cyclostationarity features, so they cannot be distinguished based on second order statistics alone. However, their higher order features, computed from the higher order cyclic cumulants (HOCC) show remarkable difference in their patterns. Hence, the HOCCs can be effectively used to distinguish between the modulations of various unknown types of signals.

What makes the Stage 5 implementation complex is the fact that HOCCs of up to the sixth order may need to be computed. The order implies the number of terms to be multiplied. For example, a Sixth Order term is obtained by multiplying the signal six times. The HOCCs are then synthesized using various combinations of these $n^{th}$ order terms where the constituent signals may or may not be conjugated. The basic equation for the higher order cyclic temporal moment function (CTMF) is given by Equation (4).

$$\hat{R}_{x_d}^\alpha(\tau; n, m) = \frac{1}{2K} \sum_{k=-K}^{K-1} \left[ \prod_{j=1}^{n} x_d^{(*)j}(k + \tau_j) \right] e^{-i2\pi\alpha k}$$

Equation (4)

Here, α is the CF of the higher order cyclic moment function, $x_d$ is the detected unknown signal, τ and $\tau_j$ are the lag factors, n is the order and m terms are conjugated. α is cycle frequency and $x_d$ is a time domain signal being processed. The symbol (*) denotes whether the complex term is conjugated or not, and τ is time offset. The HOCCs are derived from the CTMFs. The derivation becomes significantly complicated due to tunneling, where the signal $x_d$ is then decomposed into its tunneled components.

Figure 9B:
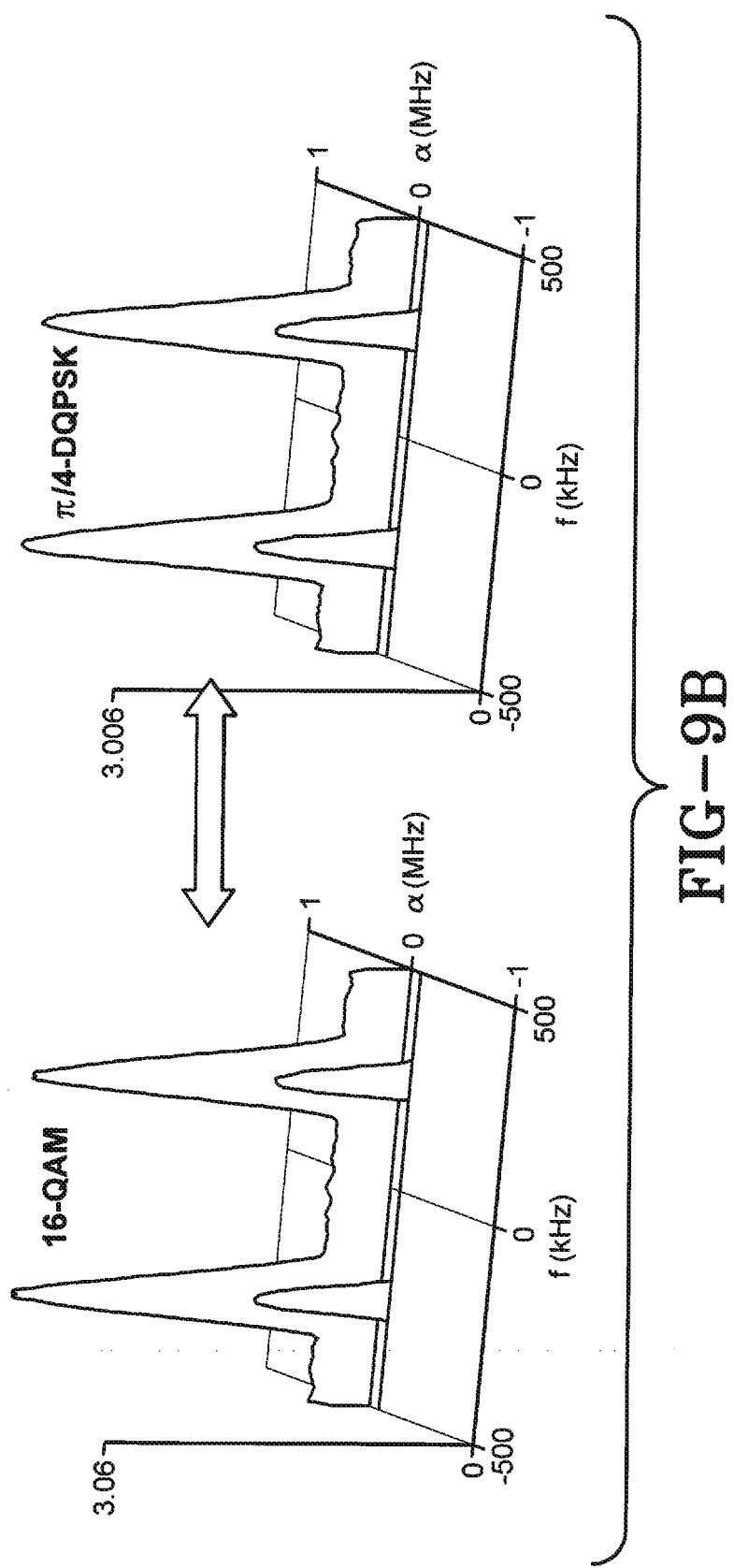
FIGS. 9B and 9C show Stage 5 higher order cyclic cumulants (HOCC) for modulation recognition where second order signal processing may not be sufficient.
Figure 9C:
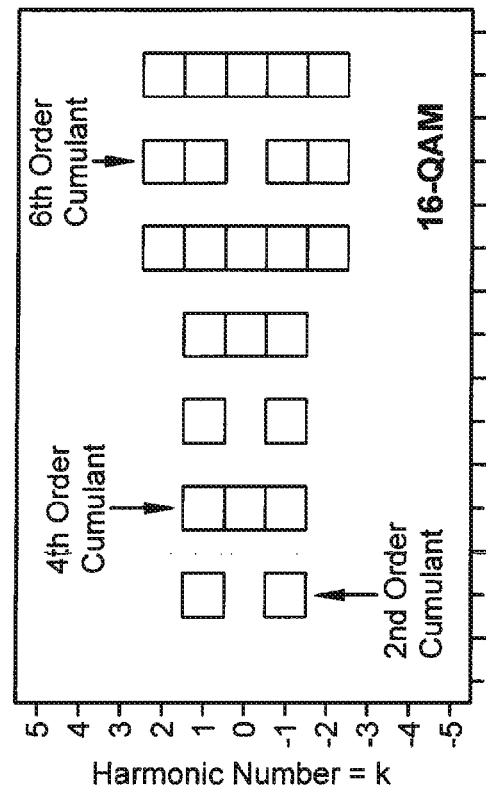

FIG. 9A shows Stage 5 Level 0 and Level 1 Cycle Frequency Pattern analysis to recognized various modulation formats. The Signal to Noise Ratio (SNR) is 3 dB in this illustration. FIGS. 9B and 9C show Stage 5 higher order cyclic cumulants (HOCC) for modulation recognition where second order signal processing may not be sufficient.

FIG. 9A shows that floating point and fixed point implementations created by the inventors match well at in-band SNR of −1 dB and we are able to classify the signal accurately as a binary phase-shift keying (BPSK) signal. Once again, ways to significantly reduce the computational complexity have been found by only processing a subset of strips for each tunnel. One other important aspect that was not highlighted earlier is the fact that Stage 5 processing involves not only the auto-SSCA, where the elements for second order SCF come from the same tunnel, but also the cross-SSCA, where the element of the SCF come from different tunnels to find CFs that are greater than the tunnel bandwidth.

FIGS. 9B and 9C show Stage 5 higher order cyclic cumulants (HOCC) for modulation recognition where second order signal processing may not be sufficient. HOCCs, in general require extensive computations and are used when second order cyclostationary statistics are not sufficient to discriminate between signals. An example of this is shown in FIG. 9B, where the second order cyclostationary statistics for 16-Quadrature Amplitude Modulation (QAM) and p/4 Differential Quadrature Phase Shift Keying (DQPSK) signals have the same patterns. As a result of this, it becomes nearly impossible to discriminate between these signals based on just the second order cyclostationary statistics. Similarly, various types of M-QAM (e. g. 4-QAM, 16-QAM, 32-QAM, 64-QAM) cannot be distinguished using the second order cyclostationary statistics alone.

FIG. 9C shows the HOCC patterns for 16-QAM and p/4-DQPSK signals. The Y-axis in the figure represents the harmonic number. The Zero line on the Y axis is the direct current (d.c.) component. +−1 represents the HOCCs corresponding to harmonics of the signal carrier frequency +/−fc. +/−2 represents the HOCCs corresponding to the harmonics of two times the signal carrier frequency (+/−2fc) etc. The x-axis corresponds to the orders of the HOCCs. The variable 'n' refers to the order of the statistic. The term 'm' refers to the number of terms that have been conjugated. For example, (2,0) refers to the second order statistic with no terms conjugated and (2,1) refers to second order statistic with one term conjugated. The patterns correspond to the statistics that show magnitude above a certain set threshold. Based on the HOCC patterns, one can see that it is possible to distinguish between 16-QAM and p/4-DQPSK modulation types. According to one embodiment of the present invention, a tunnelized version of the HOCCs was used to determine various modulations. In a degenerate case, the tunnel size may be equal to the width of the signal bandwidth.

Those skilled in the art will appreciate that we have provided novel tunnelized second and higher-order cyclostationary processing algorithms to simultaneously detect and characterize signals. Our algorithms show that severe but purposeful under-sampling of the signals through tunneling preserve the cyclostationarity of the signals, even when the tunnel bandwidth is much smaller than the signal bandwidth. This phenomenon is exploited to create low complexity and flexible suite of algorithms to simultaneously detect and characterize the signals using their cyclostationary features. It has also been demonstrated that such algorithms can detect and characterize signals under a highly adverse signal to interference plus noise ratio, even when multiple signals are co-channel and simultaneously interfering with each other.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

The invention claimed is:
1. A method comprising the steps of:
under sampling, by a channelizer, an input signal to create one or more tunnels;
taking tunnelized signal samples in the one or more tunnels each with a tunnel bandwidth that is equal to or less than a total analysis bandwidth of the input signal;
performing whitening, by a whitener circuit, of the tunnelized signal samples;
estimating, by a block averaging of a cyclic periodogram, a spectral correlation function of the tunnelized and whitened signal samples;
detecting, by analyzing results of the spectral correlation function, various second and higher order cyclostationary features of the input signal; and
determining one or more signal types based on one or more of the various second and higher order cyclostationary features that have been detected.

2. The method of claim 1 further comprising the step of:
using the channelizer with a sufficiently long window to create enough isolation between the one or more tunnels to withstand interference from other higher power signals.

3. The method of claim 2 wherein the channelizer is a polyphase windowed discrete Fourier transform channelizer.

4. The method of claim 2 further comprising the step of:
applying a block averaging circuit to each of the one or more tunnels over time to obtain an estimate of a noise floor of each of the one or more tunnels.

5. The method of claim 4 further comprising the step of:
detecting signals in each of the one or more tunnels.

6. The method of claim 5 wherein the step of detecting the signals is based on output signals from the whitener circuit.

7. The method of claim 4 further comprising the step of:
detecting signals within the one or more tunnels.

8. The method of claim 7 further comprising the step of:
detecting and classifying which of the tunnelized signal samples above the noise floor are narrow-band signals using second and higher order cyclostationary processing.

9. The method of claim 8 further comprising the step of:
detecting and classifying known types of signals using known type second order cyclostationary properties of the tunnelized signal samples.

10. The method of claim 9 wherein the step of detecting and classifying the known types of signals comprises detecting and classifying at least some of the known types of signals by determining the cycle frequencies of at least some of the tunnelized signal samples.

11. The method of claim 8 wherein the cyclic periodogram is determined by:

$$X_{p,N}(k, f) = FFTN(x_p(t - kN))$$

$$I^\alpha_{x_p x_q}(k, f) = X_{p,N}\left(k, f + \frac{\alpha}{2}\right) X^*_{q,N}\left(k, f - \frac{\alpha}{2}\right)$$

$$\hat{S}^\alpha_{x_p x_q}(f) = \frac{1}{NM} \sum_{k=0}^{M-1} I^\alpha_{x_p x_q}(k, f) e^{-i2\pi\alpha kN}$$

where FFTN( ) denotes N point Discrete Fourier Transform (DFT) processing, $X_{p,N}$ and $X_{q,N}$ correspond to the $p^{th}$ and $q^{th}$ tunnelized signal samples after DFT processing, parameter $\alpha$ is cycle frequency, parameter f is support frequency, parameter M is the number of blocks with each block containing N point DFT output, $I^\alpha_{x_p x_q}$ is the general spectral correction function with the cycle frequency $\alpha$ and is obtained by the $p^{th}$ and $q^{th}$ tunnelized signal samples, $\hat{S}^\alpha_{x_p x_q}$ is the spectral correction function after time smoothing by averaging M coherent cyclic periodograms, and k is the running index of the M coherent cyclic periodograms that are summed.

12. The method of claim 11 further comprising the steps of:
detecting unknown types of signals from the tunnelized signal samples; and
finding detected frequency intervals (DFIs) that correspond to frequency support of the unknown types of signals,
wherein the step of determining the one or more signal types is based on the DFIs.

13. The method of claim 12 further comprising the step of:
calculating a strip spectral correlation function to detect the unknown types of signals according to:

$$\hat{S}^\alpha_{x_N}(f) = \sum_{r=0}^{N-1} X_{N'}\left(r, f + \frac{\alpha}{2}\right) x^*(r) e^{-i2\pi r\left(\frac{\alpha}{2} - f\right)}$$

$$X_{N'}(r, f) = \sum_{j=-N/2}^{\frac{N'}{2}-1} a(j) x(r - j) e^{-i2\pi f(r-j)}$$

where $\hat{S}_{x_N}^\alpha$ the strip spectral correction function obtained by N samples, $x^*(r)$ is a time domain signal being processed, $a(j)$ are the coefficients of a data-tapering window, and r is the running index that represents sampled time instances.

14. The method of claim 12 further comprising the step of:
characterizing the detected unknown types of signals based on higher order cyclic cumulants (HOCCs).

15. The method of claim 14 wherein the HOCCs are calculated according to a cyclic temporal moment function:

$$\hat{R}^\alpha_{x_d}(\tau; n, m) = \frac{1}{2K} \sum_{k=-K}^{K-1} \left[\prod_{j=1}^{n} x_d^{(*)j}(k + \tau_j)\right] e^{-i2\pi\alpha k}$$

where $x_d$ is a time domain signal being processed, (*) denotes whether a complex term is conjugated, $\tau$ is time offset, n denotes the order of the cyclic temporal moment function, and m corresponds to the number of terms that are conjugated.

16. The method of claim 1 wherein the one or more cyclostationary features comprise a cycle frequency (CF).

17. The method of claim 16 wherein the CF manifests as a result of repeating features of the input signal that originate from one or more structures associated with at least one of: frame size, packet size, preamble structure, pilot patterns, hop patterns, symbol rate and chip rate.

18. The method of claim 1 further comprising the steps of:
detecting tunnelized signal samples that are above a noise floor;
detecting and classifying which of the tunnelized signal samples are narrowband signals using second and higher order cyclostationary processing;
detecting and classifying known types of signals using second order known cyclostationary properties of the tunnelized signal samples;
detecting unknown types of signals by analyzing results of the spectral correlation function of the tunnelized signal samples;
finding detected frequency intervals (DFIs) that correspond to frequency support of the unknown types of signals, wherein the step of determining the one or more signal types is based on the DFIs; and
characterizing the detected unknown types of signals based on higher order cyclic cumulants (HOCCs).

19. The method of claim 18 further comprising the steps of:
determining the cyclic periodogram by:

$$X_{p,N}(k, f) = FFTN(x_p(t - kN))$$

-continued $$I^{\alpha}_{x_p x_q}(k, f) = X_{p,N}\left(k, f + \frac{\alpha}{2}\right) X^{*}_{q,N}\left(k, f - \frac{\alpha}{2}\right)$$

$$\hat{S}^{\alpha}_{x_p x_q}(f) = \frac{1}{NM} \sum_{k=0}^{M-1} I^{\alpha}_{x_p x_q}(k, f) e^{-i2\pi\alpha kN}$$

where FFTN( ) denotes N point Discrete Fourier Transform (DFT) processing, $X_{p,N}$ and $X_{q,N}$ correspond to the $p^{th}$ and $q^{th}$ tunnelized signal samples after DFT processing, parameter $\alpha$ is cycle frequency, parameter f is support frequency, parameter M is the number of blocks with each block containing N point DFT output, $I^{\alpha}_{x_p x_q}$ is the general spectral correction function with the cycle frequency $\alpha$ and is obtained by the $p^{th}$ and $q^{th}$ tunnelized signal samples, $S^{\alpha}_{x_p x_q}$ is the spectral correction function after time smoothing by averaging M coherent cyclic periodograms, and k is the running index that represents sampled time instances;

calculating a strip spectral correlation function to detect the unknown types of signals according to:

$$\hat{S}^{\alpha}_{x_N}(f) = \sum_{r=0}^{N-1} X_{N\prime}\left(r, f + \frac{\alpha}{2}\right) x^{*}(r) e^{-i2\pi r\left(\frac{\alpha}{2}-f\right)}$$

$$X_{N\prime}(r, f) = \sum_{j=-N/2}^{N\prime/2-1} \alpha(j) x(r-j) e^{-i2\pi f(r-j)}$$

where $\hat{S}^{\alpha}_{x_N}$ the strip spectral correction function obtained by N samples, $x^{*}(r)$ is a time domain signal being processed, and $\alpha(j)$ are the coefficients of a data-tapering window; and calculating the HOCCs to distinguish between modulations of the detected unknown types of signals according to a cyclic temporal moment function:

$$\hat{R}^{\alpha}_{x_d}(\tau; n, m) = \frac{1}{2K} \sum_{k=-K}^{K-1} \left[\prod_{j=1}^{n} x_d^{(*)j}(k + \tau_j)\right] e^{-i2\pi\alpha k}$$

where $x_d$ is a time domain signal being processed, (*) denotes whether a complex term is conjugated or not, $\tau$ is time offset, n denotes the order of the cyclic temporal moment function, m corresponds to number of terms that are conjugated, and k is used to sum terms from harmonic numbers $-K$ to $+K-1$.

20. The method of claim 1, wherein the under sampling of the input signal is accomplished by compressive sensing.

* * * * *